(12) United States Patent
Reilly

(10) Patent No.: US 10,956,611 B2
(45) Date of Patent: Mar. 23, 2021

(54) METHODS, SYSTEMS, AND MEDIA FOR DATA ANONYMIZATION

(71) Applicant: John J. Reilly, New York, NY (US)

(72) Inventor: John J. Reilly, New York, NY (US)

( * ) Notice: Subject to any disclaimer, the term of this patent is extended or adjusted under 35 U.S.C. 154(b) by 64 days.

(21) Appl. No.: 16/153,636

(22) Filed: Oct. 5, 2018

(65) Prior Publication Data

US 2020/0110903 A1 Apr. 9, 2020

(51) Int. Cl.
G06F 21/62 (2013.01)
H04N 1/44 (2006.01)
H04L 29/06 (2006.01)
G06F 40/103 (2020.01)

(52) U.S. Cl.
CPC ........ *G06F 21/6254* (2013.01); *G06F 40/103* (2020.01); *H04L 63/0421* (2013.01); *H04N 1/4446* (2013.01)

(58) Field of Classification Search
CPC ............ G06F 21/6254; H04L 63/0421; H04N 1/14446
See application file for complete search history.

(56) References Cited

U.S. PATENT DOCUMENTS 6,990,590 B2  1/2006 Hanson et al.
8,694,646 B1 * 4/2014 Kothari ............... H04L 63/0435
                                                     709/227
2014/0012857 A1  1/2014 Moraleda
2014/0201007 A1  7/2014 Stack et al.
2016/0162734 A1  6/2016 Ross et al.
2017/0302641 A1* 10/2017 Ramatchandirane .......................
                                                     G06Q 20/327
2020/0097679 A1*  3/2020 Fisse .................. G06F 21/6254

OTHER PUBLICATIONS

PCT Notification of Transmittal of the International Search Report and the Written Opinion of the International Searching Authority for PCT Application No. PCT/US19/53858, dated Dec. 27, 2019, 10 pages.

* cited by examiner

*Primary Examiner* — Ellen Tran
(74) *Attorney, Agent, or Firm* — Jaffery Watson Mendonsa & Hamilton LLP

(57) ABSTRACT

Aspects of the disclosure provide for mechanisms data anonymization. A method of the disclosure includes: receiving, by a processing device, a user input initiating anonymization of a first electronic document, wherein the first electronic document comprises at least one first data item relating to personally identifiable information and at least one second data item not related to the personally identifiable information; in response to receiving the user input, generating a second electronic document, wherein the second electronic document comprises a digital fingerprint of the first electronic document and the at least one second data item; and transmitting, to a server, the second electronic document as an anonymized version of the first electronic document.

20 Claims, 15 Drawing Sheets

METHODS, SYSTEMS, AND MEDIA FOR DATA ANONYMIZATION

TECHNICAL FIELD

The implementations of the disclosure generally relate to computer systems and, more specifically, to methods, systems, and media for data anonymization.

BACKGROUND

Data anonymization may involve processing data so that a user associated with the data cannot be identified by the recipient of the data. For example, personal information that can be used to identify the user, such as names, addresses, and Social Security numbers, can be removed or encrypted to prevent disclosure of the identity of the user. Some regulations, such as the European Union's General Data Protection Regulation (GDPR), set data protection or privacy requirements, some of which may be met by using data anonymization methods.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

SUMMARY OF THE DISCLOSURE

Figure 1:
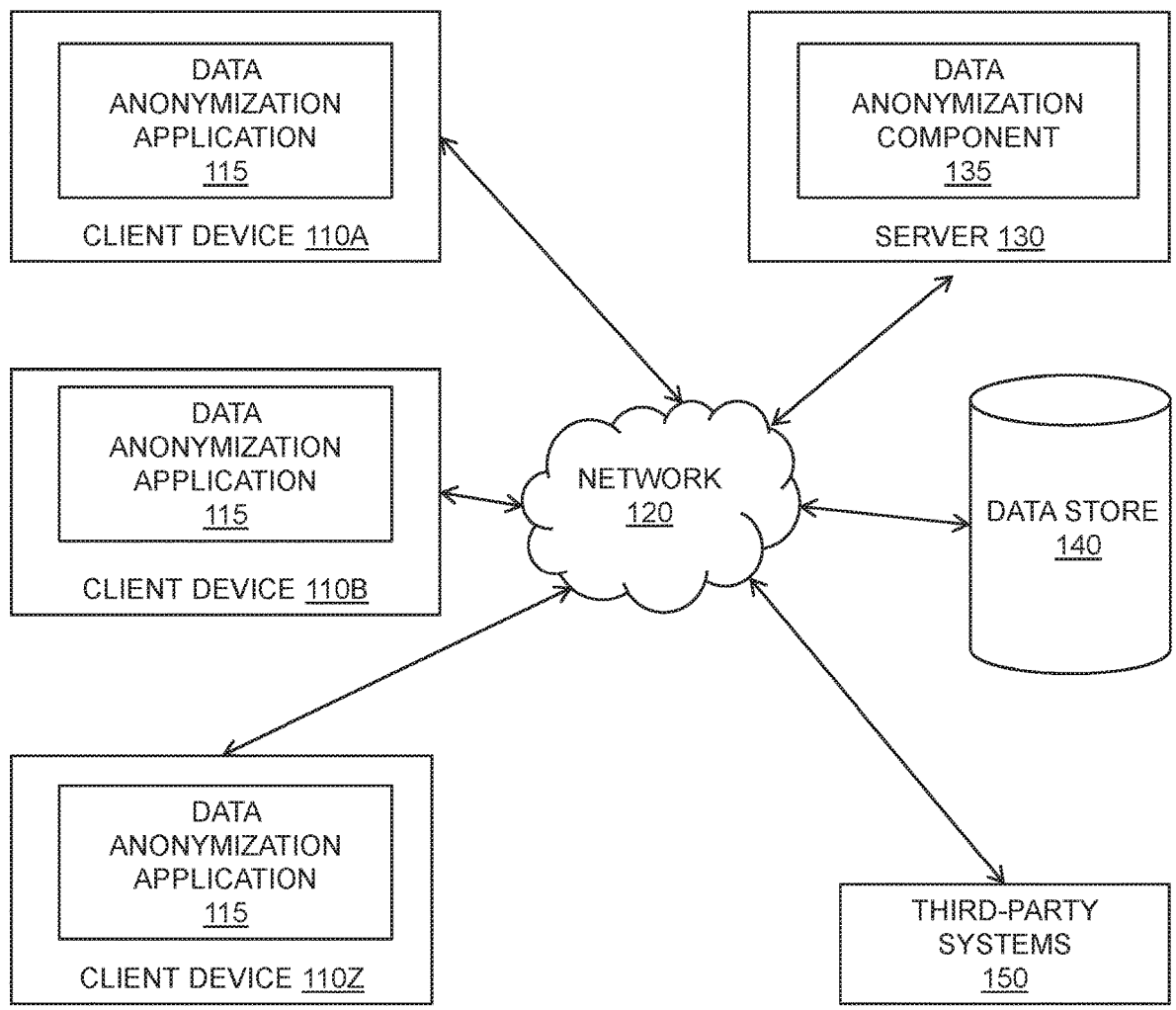
FIG. 1 is a block diagram of a network architecture in which implementations of the disclosure can operate.

The following is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In accordance with some embodiments of the present disclosure, a method of data anonymization may include: receiving, by a processing device, a user input initiating anonymization of a first electronic document, wherein the first electronic document comprises at least one first data item related to personally identifiable information and at least one second data item not related to the personally identifiable information; generating a second electronic document, wherein the second electronic document comprises a digital fingerprint of the first electronic document and the at least one second data item; and transmitting to a server the second electronic document as an anonymized version of the first electronic document.

In some embodiments, the second electronic document does not comprise information related to the at least one first data item. In some embodiments, the second electronic document may include a timestamp associated with the first electronic document.

In some embodiments, the second electronic document can include a user identifier associated with an account of the user.

In some embodiments, the method may involve receiving the first electronic document in a first-data format and converting the first electronic document into a second-data format that is machine-readable.

In some embodiments, the first-data format comprises at least one of an email format or an image format, and the second-data format further comprises at least one of a text format or an Extensible Markup Language (XML) format.

In some embodiments, the second electronic document further comprises information indicative of the first-data format.

In some embodiments, generating the second electronic document may include generating, by the processing device, the digital fingerprint of the first electronic document, and extracting at least one second-data item from the first document based on the data identifier.

In accordance with some embodiments of the present disclosure, a method for data anonymization can involve obtaining a first anonymized document representative of an anonymized version of a first receipt, wherein the first anonymized document comprises first merchant data related to the first receipt; comparing, by a processing device, the first merchant data with stored merchant data associated with a plurality of stored anonymized documents; and in response to detecting a match between the first merchant data and at least a portion of the stored merchant data, updating the purchase-order data related to the stored-merchant data based on the first anonymized document.

In some embodiments, the method may further involve comparing a first digital fingerprint of the first anonymized document with stored digital fingerprints of stored anonymized documents, and comparing the first merchant data with the stored merchant data in response to determining that the first digital fingerprint matches at least one of the stored digital fingerprints.

In some embodiments, the method may further involve obtaining a second anonymized document representative of an anonymized version of a second receipt, wherein the second anonymized document comprises second merchant data related to the second receipt, and comparing the second merchant data with the stored merchant data associated with the stored anonymized documents. In response to determining that the second merchant data does not match the stored merchant data, determining, by the processing device, that the second anonymized document contains personally identifiable information of a user.

In some embodiments, the method may further involve rating the first receipt based on a data format related to the first receipt, wherein the first anonymized document comprises the data format.

In some embodiments, the first merchant data comprises at least one of a merchant name or a merchant address.

In some embodiments, updating the purchase-order data related to the stored merchant data may further include updating a counter related to the merchant data.

In some embodiments, updating the purchase-order data related to the stored-merchant data may further involve creating, based on the first anonymized document, a data set of one or more purchased items in the first receipt; the data set comprising the first merchant data.

In some embodiments, the method may further involve extracting data about the purchased item from the first anonymized document. The data set of the purchased item comprises the extracted data about the purchased item; the data about the purchased item comprising at least one of: a name of the purchased item, a price of the purchased item, and a timestamp related to the purchased item.

DETAILED DESCRIPTION

Data anonymization may involve processing data so that a user associated with the data cannot be identified by the recipient of the data. For example, personal information that can be used to identify the user, such as names, addresses, and Social Security numbers, can be removed or encrypted to prevent disclosure of the identity of the user. However, anonymized data generated using conventional anonymization techniques can be de-anonymized by cross-referencing other sources of data. As such, the identity of the user may still be discovered after data about the user has been anonymized using the conventional data anonymization techniques.

Due to the lack of efficient data-anonymization techniques, users may have to adopt robust methods to protect their privacy. For example, users may have to delete their information from all websites that can store user data and use specialized encryption or privacy tools to process their data before uploading the data (e.g. posting on a social media platform). This may be burdensome to users who are not proficient in computer technologies. The lack of efficient data anonymization techniques may also make users reluctant to provide user data via the Internet and thus hinder their ability to receive personalized search results and other services.

Aspects of the disclosure address the above and other deficiencies by providing data anonymization techniques that anonymize user data at both the client side and the server side to ensure protection of user privacy. The techniques described herein include a data anonymization application running on a client device (e.g., a mobile phone, a computer, etc.). Before uploading to the Internet data related to a user, the data anonymization application can anonymize the data to generate an anonymized version of the data. The anonymized version of the data does not include the user's personally identifiable information and so cannot be used to identify the user.

For example, the anonymization application can receive a first electronic document containing the data related to the user (e.g., a receipt related to one or more purchases made by the user). The anonymization application can extract data items that are not related to the user's personally identifiable information from the first electronic document. The data items may include, for example, merchant data (e.g., a merchant name, a merchant address, etc.), data about one or more purchased items (e.g., product names, quantities, purchase prices, etc.), timestamps (e.g., a purchase time), etc. The anonymization application can generate a digital fingerprint of one or more features of the first electronic document. The anonymization application can also generate a second electronic document representing an anonymized version of the first electronic document. For example, the anonymization application can generate the second electronic document by combining the data items that do not include the personally identifiable information, non-personally identifiable information such as the digital fingerprint, etc. The anonymization application can also transmit the second electronic document to a server.

The server can anonymize the second electronic document. For example, the server can compare the merchant data in the second electronic document with stored merchant data associated with stored anonymized documents to try to find a match. The stored anonymized documents can be previously processed anonymized documents. In response to determining that the merchant data in the second electronic document does not match any of the stored merchant data, the server may determine that the merchant data in the second electronic document may correspond to personally identifiable information. As such, the server may detect personally identifiable information that has been mistakenly uploaded to the server. This additional check may further protect user privacy using the data-anonymization techniques disclosed herein. The server may also process timestamp data related to the first and/or the second electronic document (e.g., by encrypting and/or hashing the timestamp data) for storage. As such, the timestamp data cannot be used to de-anonymize the anonymized data produced by the server. The anonymized data generated by the server can thus be made resilient to de-anonymization.

As referred to herein, personally identifiable information may include any information that can be used to identify a user, such as a name, address, bank account, Social Security number, telephone number, email address, etc.

The systems and methods described herein include technology that enhances data anonymization technology. In particular, aspects of the present disclosure provide technology that enhances the security, reliability, and/or performance of a computer system implementing data anonymization techniques. Compared to conventional data anonymization techniques, the mechanisms disclosed herein provide efficient data anonymization resilient to de-anonymization.

Accordingly, the disclosure herein provides for data anonymization techniques that can be used for privacy protection. Currently, privacy protection is costly for users because greater privacy results in less personalization. Taking radical privacy protection measures prevents users from easily releasing or creating personal data to obtain more relevant search results, and prevents websites from collecting the data that is used to tailor their information to users. Less personalized web content is inefficient for users, as it increases the users' research time for each query. For example, if a user adopts a dog, a large set of the user's prior internet behavior could be useful in predicting which dog-product advertisements would interest the user. However, if the user has blocked internet systems from collecting the user's personal data, it would take considerable time and effort for the user to intentionally create the search data that is usually automatically generated as a byproduct of years of online behavior.

Most personalization is based on internet computer systems making inferences from a user's online behavior. Given enough user activity and a large data set of similar users, user intent is not only clear, but also predictable. But a smaller data set yields murky signals. If users protect their privacy so thoroughly that servers do not have enough data to make a proper determination, advertisements may have no value to them.

In the usual interface between users and merchants, internet computer systems develop user profiles by monitoring each user's internet activity. This system is inefficient and may draw inaccurate conclusions from data exchanges between users and merchants, particularly when users choose to restrict the data they share with computer systems or when users' internet behavior does not reflect the signal that the users want merchants to receive.

Users are not in control of what happens to the data their activity generates: They do not know what data is being supplied, whether the data is accurate, or which merchants are receiving it. When they receive an advertisement, users also do not know which parts of their data the merchant used to target the advertisement to them. They may have received the advertisement because the merchant chose to send it to users with a particular set of characteristics. When a user clicks on the advertisement, the user's internet browser sends the user to the merchant website. If the user makes a purchase and supplies personal information, the merchant may assume the user corresponds to the set of characteristics they designated for the advertisement. A technology-savvy user can avoid this transfer of data to the merchant by using a browser tool to examine the source code of the webpage, find the Uniform Resource Locator (URL) for the advertisement in the source code, and enter that URL's root URL into the user's browser. This laborious, complex procedure is one of few ways an internet user can respond to an advertisement without simultaneously transferring the user's data to the merchant.

Internet users are concerned about their privacy. Most believe privacy is a fundamental right; they also see privacy as the theoretical basis of data security. Concerns about privacy and data security led the European Union to implement the General Data Protection Regulation (GDPR) and California to pass the Consumer Privacy Act. Under these regulations, users can request a copy of their data, request that their data be deleted from a server, and must give their consent before a data collector or processor can share their data. These regulations grant significant control to users who choose not to share any of their data. But the regulations still do not allow users to control their data when they choose to exchange it with merchants.

One way users can both share and control their data is to use a new set of tools to collect, process, and publish it. Although user data that is controlled by servers has grown exponentially, there has also been significant growth in data that users control in online accounts and client devices: browser histories, bookmarks, cookies, downloaded activity data and profiles, email, and digitally created documents such as receipt data. The implementations described herein enable users to choose which of this data to upload to an internet site to create a profile for merchants.

Digital receipts are particularly useful to share because they provide the best indication of a user's interests and intentions without revealing other personal information such as geographic location, marital status, and political affiliation. For example, if a user is interested in running equipment, the user can convey his or her interest by posting the anonymized data from his or her last four running-equipment purchases, rather than revealing all of his or her online activity or demographic information. Receipt data is more difficult to fraudulently create or duplicate because users do not share the information in receipts as often as they share other data, such as website links. In the process of anonymizing receipt data for users, the implementations described herein can also validate the authenticity and uniqueness of receipt data to a greater degree than other data.

In order to provide a solution to these problems, implementations herein both anonymize user data and make it difficult to de-anonymize—that is, to connect to a user through other data sources. Before uploading a user's data to the internet, client software on the client device can anonymize the data to ensure that personally identifiable information is not uploaded to the system. During the account-creation process, client software can forbid using personally identifiable information such as an email address or phone number as a password. Anonymizing personally identifiable information at the client level renders the user anonymous to the system. Client-level anonymization also creates a password problem: If users lose their password, they cannot turn to one of the commonly used authentications such as an email address. To retrieve a password, users typically match the answers to three common questions that were generated when the account was created. If users forget both their account password and these three tokens, they must recreate their account.

The server of implementations of the disclosure can take several steps to prevent a user's identity being inadvertently revealed to other users. The server can perform checks for erroneous leaks of personally identifiable information. For example, the server can check whether a user's name and address were mistakenly uploaded as a merchant's name and address. The server can also hash timestamps on items by using a technique such as encrypting the database table containing dates to make the timestamp data unreadable if the server is hacked. Even with personally identifiable information removed, a user's identity may be inadvertently revealed to another user if he or she can be identified by certain unique identifiers—data that is unique to the system or a particular geographic area. To address this potential problem, the server can further anonymize this category of uniquely identifiable data by displaying the data's general characteristics. Although the system allows users to explore the data of other users, it differentially anonymizes all users' data, so it cannot be matched with a particular individual.

The server can also provide an opt-out option for not sharing anything in certain categories of data, such as sensitive health information.

The techniques disclosed herein can make user information not only anonymous but also difficult to de-anonymize. Even if a data breach occurred in the server, a user's data could only be connected to him or her through an arduous process of gaining access to many other large data systems and determining how third-party timestamps of data were scrambled by the server.

The server can know users by their client ID and password and does not store other information of users, such as IP address and client-device information, which ensures the system cannot buy and sell user data. The system also does not collect email addresses, which ensures it can only interact with the user when the user chooses to interact with it.

FIG. 1 is a block diagram of an example of a computer system 100 according to some embodiments of the present disclosure. "Computer system" as used herein may be and/or include a system comprising one or more processors, one or more memory devices, and one or more input/output (I/O) interfaces. The computer system 100 consists of one or more client devices: 110A, 110B, 110Z, servers 130, third-party systems 150, a data store 140, and/or any other suitable component for implementing various embodiments of the present disclosure.

Each of the client devices 110A, 110B, 110Z, the servers 130, the third-party systems 150, and the data store 140 may be and/or include any suitable computer system, such as a server, a workstation, a personal computer (PC), a mobile phone, a palm-sized computing device, a personal digital assistant (PDA), etc.

"Processor" or "processing device" as used herein may be and/or include a device capable of executing instructions encoding arithmetic, logical, or I/O operations. In one example, a processor can follow a Von Neumann architectural model and can comprise an arithmetic logic unit (ALU), a control unit, and a plurality of registers. In a further aspect, a processor can be a single core processor that is typically capable of executing one instruction at a time (or process a single pipeline of instructions), or a multi-core processor that may simultaneously execute multiple instructions. According to another aspect of the disclosure, a processor can be implemented as a single integrated circuit, two or more integrated circuits, or can be a component of a multi-chip module (e.g., in which individual microprocessor dies are included in a single integrated circuit package and hence share a single socket). In some embodiments, a processor can also be a central processing unit (CPU).

"Memory device" as used herein can be and/or include a volatile or non-volatile memory device, such as RAM (random-access memory), ROM (read-only memory), EEPROM (electrically erasable programmable read-only memory), or any other device capable of storing data.

"I/O device" as used herein can be and/or include a device capable of providing an interface between a processor and an external device capable of inputting and/or outputting binary data.

"Network interface controller" (NIC) as used herein may be and/or include a computer hardware component that connects a computer to a computer network. An NIC can include electronic circuitry required to communicate with other networked devices using specific physical layer and data-link layer standards.

In some embodiments, the components of the computer system 100 may be connected via a network 120, which may be any network configured to send and/or receive data communications using various communication protocols, such as AppleTalk, transmission control protocol/internet protocol (TCP/IP), multiprotocol label switching (MPLS), hypertext transport protocol (HTTP), simple mail transfer protocol (SMTP), and file transfer protocol (FTP), internet packet exchange (IPX), systems network architecture (SNA). A network can include a wide-area network (WAN) or local-area networks (LAN), such as Ethernet, token-ring, or other LAN. In some embodiments, networks can include virtual private networks (VPN), public-switched telephone networks (PSTN), infra-red networks, or any wireless network, including networks implementing the IEEE 802.11 family of standards, Bluetooth®, Bluetooth® Low Energy, NFC and/or any other wireless protocol. Network 120 can also include a mobile network, such as a mobile telephone network, cellular network, satellite network, etc. In some embodiments, each network 120 may include a combination of networks described herein or other networks as are known to one of ordinary skill in the art.

As illustrated in FIG. 1, each of the client devices 110A-110Z can run a data anonymization application 115. The data anonymization application 115 may be implemented as a mobile application (e.g., an application running on a phone, tablet, watch, digital media player, or any other mobile device), a desktop application, a web application running in a web browser, and/or any other suitable computer program. The data anonymization application 115 can anonymize data related to a user. In some embodiments, the data may include receipt information of one or more receipts. For example, the data anonymization application 115 may receive a first electronic document that includes the data. The first electronic document may include one or more receipts. The data anonymization application 115 can generate a second electronic document representative of an anonymized version of the first electronic document. For example, the data anonymization application 115 can generate a digital fingerprint representative of one or more features of the first electronic documents. The data anonymization application 115 can also extract one or more data items that do not contain personally identifiable information from the first electronic document. The data items may include data about one or more merchants included in the first electronic document (also referred to as the "merchant data", such as a merchant name, a merchant address, etc.) The data items also may include data about purchased items (e.g., a product name, a purchase price, a purchase date, etc.). The data anonymization application 115 can then combine the digital fingerprint, the extracted data items (e.g., the merchant data, the data about the purchased items, etc.), a timestamp associated with the first electronic document, and/or any other suitable non-personally identifiable information to generate the second electronic document.

In some embodiments, the data anonymization application 115 may include one or more components as described in the discussion of FIGS. 2-3 below. The data anonymization application 115 may perform various operations discussed herein with reference to FIGS. 4-6.

The data anonymization application 115 can transmit the second electronic document to the server 130 as an anonymized version of the first electronic document. The data anonymization component 135 of the server 130 may further anonymize the second electronic document. For example, to detect accidental uploads of personally identifiable information, the data anonymization component 135 can compare the merchant data in the second electronic document with stored merchant data associated with stored anonymized documents to identify a match. The stored anonymized documents may be previously processed anonymized documents including receipt information. In response to determining that the merchant data in the second electronic document does not match any of the stored merchant data, the data anonymization component 135 may determine that the merchant data in the second electronic document may correspond to personally identifiable information. As such, the data anonymization component 135 may detect personally identifiable information that is mistakenly uploaded to the server 130. This may further ensure protection of user privacy using the data anonymization techniques disclosed herein. In some embodiments, the data anonymization component 135 may include one or more components as described in the discussion of FIG. 7 below. The data anonymization component 135 may perform various operations discussed herein with reference to FIGS. 6-8.

The data store 140 as used herein may include any suitable device that is capable of storing data to be used in accordance with the present disclosure. For example, the data store 140 may store anonymized documents, merchant data associated with the anonymized documents, digital fingerprints associated with the anonymized documents, data sets related to purchased items, etc.

The third-party systems 150 can include one or more computer systems providing various services and/or platforms to the client device 110A-110Z and/or the server 130. For example, the third-party systems 150 can provide an email service, a content sharing service, a social networking service, a messaging service, a mapping service, an e-commerce platform, an advertising service, etc.

As an example, a first user may provide anonymous information to the third-party systems 150 for one or more services provided by the third-party systems 150. For example, the first user can upload one or more receipts via a client device 110A. The data anonymization application 115 can perform data anonymization on the receipts to generate anonymized versions of the receipts. The data anonymization application 115 can then provide the anonymized versions of the receipts to the server 130 for further anonymization and/or processing. For example, the data anonymization component 135 can process the anonymized versions of the receipts in accordance with the present disclosure to prevent inadvertently revealing the first user's personally identifiable information. The server 130 can then provide data derived from the anonymized versions of the receipts to the third-party systems 150 as anonymized data. The third-party systems 150 may analyze the anonymized data to identify a purchase pattern of the first user. The third-party systems 150 may also identify one or more other users having the same or similar purchase pattern (also referred to as "related users"). The third-party systems 150 may further identify one or more products and/or services that did interest the identified related users and may provide recommendations of the products and/or services to the first user. The third-party systems 150 may also identify one or more merchants that may provide the products and/or services. The third-party systems 150 may then cause information about the products, services, and/or the merchants to be presented to the first user (e.g., by causing one or more user interfaces to be displayed on the client device). For example, when the first user searches for a certain product (e.g., "trail running shoes,"), the third-party systems 150 may provide recommendations of products and/or merchants based on items purchased by the related users.

In some embodiments, the first user may upload a significant number of receipts via the client device 110A. For example, as is discussed in greater detail below, the data anonymization application 115 can acquire receipts for the first user by importing documents (e.g., emails, images, files, etc.) related to a user account of the first user. The data anonymization application 115 can also sort the imported documents into "receipts" (e.g., documents including receipts) and "non-receipts" (e.g., documents that do not include receipts). The imported documents may be sorted by scanning the imported documents for keywords related to receipts (e.g., "receipt," "product," "total," common merchant names, common merchant addresses, common product names, etc.). The imported documents may also be sorted using a classifier that is trained to classify an input document into "receipt" or "non-receipt." The classifier may be trained using any suitable machine learning technique.

In some embodiments, the third-party systems 150 may analyze the anonymized data provided by the first user to provide the first user with a view of the first user's expenditures. In some embodiments, the third-party systems 150 may provide the first user with an option to upload anonymized data in exchange for discounts on certain products and/or services.

In some embodiments, the third-party systems 150 may provide gift recommendations to the first user. For example, the first user may create a profile for a second user by providing a product that the second user likes. The third-party system 150 may provide recommendations of products based on the product. The first user can add more products to the profile of the second user. The first user may select one or more of the recommended products as a gift to the second user.

Figure 2:
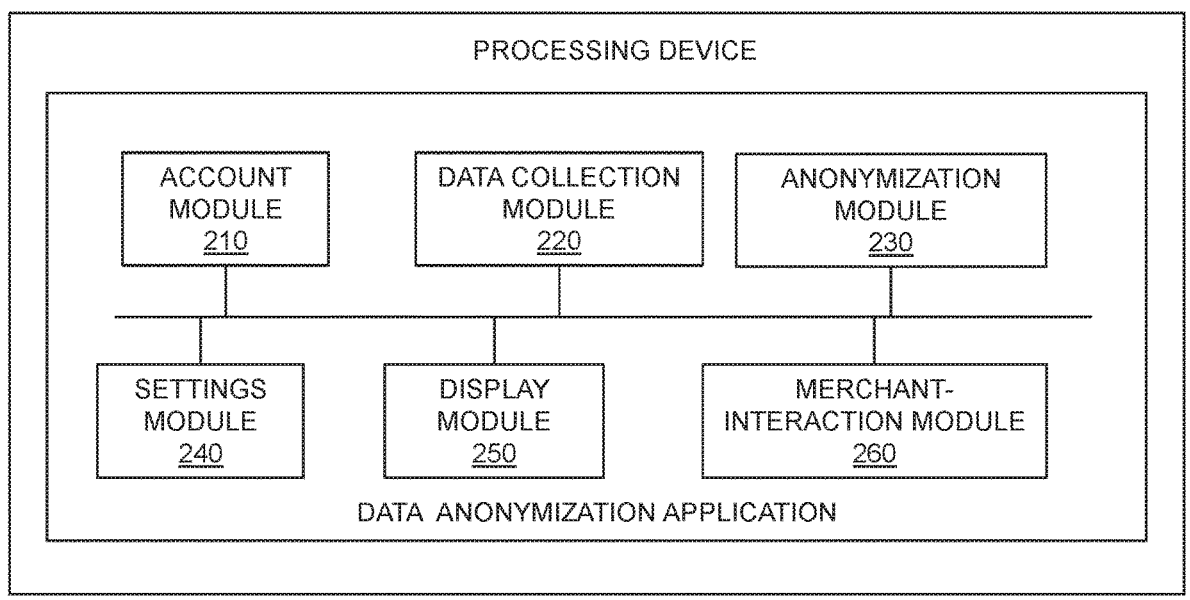
FIG. 2 is a block diagram of a detailed view of a computer system implementing a data anonymization application in accordance with some embodiments of the present disclosure.

FIG. 2 depicts a block diagram illustrating an example 200 of a computer system in accordance with some implementations of the disclosure. The data anonymization application of FIG. 2 may be the same as the data anonymization application 115 of FIG. 1. As illustrated, the data anonymization application may include an account module 210, a data-collection module 220, an anonymization module 230, a settings module 240, a display module 250, and a merchant-interaction module 260. More or fewer components may be included without loss of generality. For example, two or more of the components or portions of the components may be combined into a single component, or one of the components may be divided into two or more modules. In one implementation, one or more of the modules may be executed by different processing devices on different computing devices (e.g., different computer servers).

The account module 210 can perform one or more functions to create and/or manage user accounts. For example, the account module 210 can prompt a user to provide information to create a user account (e.g., by displaying one or more user interfaces including a prompt to provide a username, a password, etc.). In some embodiments, the account module 210 can prompt the user to provide information to create a user account in response to determining that the user is a new user (e.g., by detecting the user's initial use of the data anonymization application). The account module 210 can generate a client identification (ID) that can uniquely identify the user's data anonymization application. The account module 210 can then associate the information provided by the user (e.g., a password) with the client ID. For example, the account module 210 can send the client ID and the information provided by the user to the server 130 for storage and/or processing. The server 130 may store the client ID in association with the information provided by the user. The client ID, the password, etc. may be used later by the user to log onto a server maintained by the server 130.

In some embodiments, the account module 210 can present one or more messages to indicate that personally identifiable information (e.g., an email address, a phone number, etc.) is not allowed to be used as the password. As is discussed in greater detail below, the data anonymization application does not send any personally identifiable information to the server 130 or any other device. As such, if the user loses his password, the server 130 may not be able to assist the user in recovering the password by emailing or texting it. The account module 210 may use biometric identifying information (e.g., one or more fingerprints, facial data, etc. of the user) as an alternate password in embodiments where the client device is capable of making biometric identifications. For example, the account module 210 can verify the user's identity by making one or more API calls to request that the client device's operating system or other application running on the client device biometrically identify the user. In some embodiments, the account module 210 may also prompt the user to create multiple lost-password-retrieval tokens. Each of the tokens may be an object (e.g., a variable, a data structure, a function, a method, etc.) containing data that can be used to retrieve a password. These tokens may be answers to questions that only the user knows. The account module 210 may allow the user to reset the password if the user can provide each of the lost-password-retrieval tokens. If the user cannot provide correct answers to the token questions, the account module 210 may prompt the user to create a new account.

The data-collection module 220 may receive data related to the user account to implement various embodiments of the present disclosure. The data may include, for example, receipt information related to one or more receipts. The data may be obtained by receiving one or more input documents in any suitable format, such as one or more emails, text documents, images, etc. The data may be received via any suitable data source. For example, the data may be received by making one or more API calls to request the data from the OS of the client device or one or more applications running on the client device. In some embodiments, the data may be received via a wireless communication link. In some embodiments, the data-collection module 220 may include one or more components described in the discussion of FIG. 3. The components of the data-collection module 220 may receive data from various data sources.

In some embodiments, the data-collection module 220 may convert the input documents into electronic documents with a format suitable for processing by the anonymization module 230 and/or any other component of the data anonymization application 115, such as a machine-readable document format (e.g., a text format, an XML, format, etc.). The converted electronic documents may include information about the structure of the input documents. As is described in greater detail in the discussion of FIGS. 3 and 5A-5E, the data-collection module 220 may use various methods to collect data from client devices of various capacities and/or data from various sources.

In some embodiments, the display module 250 can display the received data on the client device. The display module 250 may also present one or more user interfaces to prompt a user to initiate anonymization of the received data (e.g., by presenting an "Anonymize" button or any other suitable user interface element). In response to receiving user input initiating the anonymization of the received data (e.g., a user selection of the "Anonymize" button), the data-collection module 220 can send the converted documents to the anonymization module 230 along with a notation of the total number of receipts.

The anonymization module 230 can receive the input documents and/or the converted electronic documents from the data-collection module 220 and can anonymize them. In some embodiments, the anonymization module 230 may anonymize the received documents by extracting non-personally identifiable data items from the received documents and generating anonymized versions of the received documents based on the extracted non-personally identifiable data items. For example, the anonymization module 230 may receive a first electronic document with a plurality of data items. One or more of the data items may relate to personally identifiable information (also referred to as the "first data items"), and one or more of the data items may not relate to personally identifiable information (also referred to as the "second data items"). The anonymization module 230 can generate a receipt identification that includes data about one or more merchants, such as a merchant name, address, zip code, order-identification number, purchase time, etc. Generating and using receipt identifications at the client level in accordance with the present disclosure may address several issues that can occur during data collection and anonymization: It may enable the data anonymization component 135 to check newly uploaded data against existing data for duplicates. For example, receipt identifications of various electronic documents may be used to identify duplicate receipts uploaded by a user accidentally processing duplicate receipts from one or more modules of the gather module 220 or accidentally processing duplicate receipts from another user, etc.

The anonymization module 330 can generate a second electronic document that represents an anonymized version of the first electronic document based on the second data items, the merchant identification, an identification of the first electronic document (e.g., the receipt identification), a data source of the first electronic document (e.g., a module as described in the discussion of FIG. 3), the client ID, etc. The anonymization module 330 can then upload the second electronic document to the user's online account and can delete the original data from a local memory associated with the anonymization application 115. In some embodiments, the anonymization module 230 can perform one or more operations described in the discussion of FIG. 6 below to anonymize the first electronic document.

The settings module 240 can receive, process, store, etc. user settings related to one or more user accounts. For example, the settings module 240 can provide one or more user interfaces for users to set account preferences for how frequently to scan receipts from email accounts, whether to store email-account information in memory, how and whether to display personal data (such as their general geographic location) to other users, whether to automatically delete sensitive data or to hide sensitive data from other users, the criteria for sending notifications, etc.

The display module 250 can provide data (e.g., audio data, video data, images, graphics, etc.) to be used to present messages, user interfaces, and/or any other information on a display in accordance with the present disclosure. The display module 250 can also provide various modes for displaying messages, user interfaces, etc. (also referred to as "display modes"). Examples of display modes may include displaying data arranged by particular attributes, searching for an item of interest, displaying node or branched connections between users' data, and displaying predictions about users' future purchases based on correlations between the histories of their purchases. In some embodiments, the display module 250 may present one or more messages to prompt the user to select one or more of the display options and may present data in the display modes selected.

The merchant-interaction module 260 can enable users to send or withhold their data in response to merchant advertisements. For example, the merchant-interaction module 260 can provide a user with options to connect to a merchant website with data transfer or without data transfer. The merchant-interaction module 260 may also inform the user of user data that may be revealed to the merchant website. In some embodiments the merchant-interaction module 260 can present one or more user interfaces such as the user interface 900 illustrated in FIG. 9.

Figure 3:
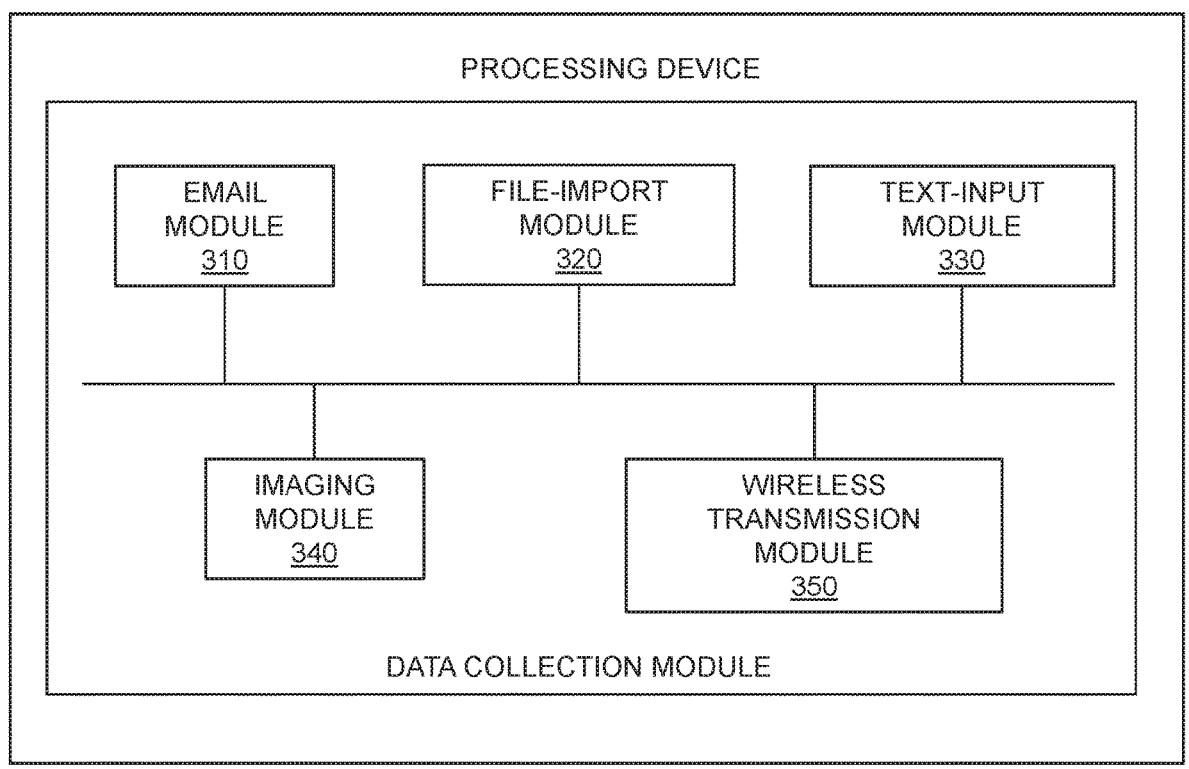
FIG. 3 is a block diagram of a detailed view of a computer system implementing a data-collection module in accordance with some embodiments of the present disclosure.

FIG. 3 is a block diagram of an example 300 of a computer system in accordance with some implementations of the disclosure. The data-collection module of FIG. 3 may be same as the data-collection module 220 of FIG. 2. As illustrated, the data-collection module may include an email module 310, a file-import module 320, a text-input module 330, an imaging module 340, and a wireless transmission module 350. More or fewer components may be included, two or more of the components or portions of the components may be combined into a single component, or one of the components may be divided into two or more modules, without loss of generality. In one implementation, one or more of the modules may be executed by different processing devices on different computing devices (e.g., different serve computers).

The email module 310 can receive receipt information from one or more of a user's email accounts. For example, the email module 310 can import one or more emails associated with one or more of the user's email accounts, sort the emails into those with receipt information and those without receipt information, and process the emails with receipt information into formatted text (e.g., XML documents). In some embodiments, the email module 310 can perform one or more operations as described in the discussion of FIG. 5A.

The file-import module 320 can receive information by importing one or more files. For example, the file-import module 320 can make one or more API calls to request that a client device's operating system (OS) or one or more applications running on the client device provide one or more files. In some embodiments, the file import module 320 can present an interface to prompt a user to select one or more files to be processed. In some embodiments, the file import module 320 can perform one or more operations as described in the discussion of FIG. 5B.

The text-input module 330 can process user inputs of receipt information. For example, the text-input module 330 can present one or more interfaces that display text fields, checkboxes, and/or any other user-interface elements by which a user can enter receipt information. The receipt information may include details about one or more purchased items (e.g., product names, service names, purchase dates, quantities, etc.), merchant data related to the purchased items (e.g., merchant names, merchant addresses, etc.), and/or any other information in a receipt. In some embodiments, the text-input module 330 can perform one or more operations as described in the discussion of FIG. 5C.

The imaging module 340 can acquire receipt information via one or more images. In one implementation, the imaging module 340 can acquire the one or more images via a camera on the client device. For example, the imaging module can access the camera using one or more of the operating system's application program interfaces (APIs). The imaging module can also prompt a user to capture images of one or more receipts (e.g., by presenting one or more user interfaces). The imaging module can then import the images into its memory to finish converting the physical receipt into a formatted electronic document. In another implementation, the imaging module 340 can acquire the images from a storage device. In some embodiments, the imaging module 340 can perform one or more operations as described in the discussion of FIG. 5D.

The wireless transmission module 350 can receive documents including receipt information via a wireless communication link (e.g., a Wi-Fi link, BLUETOOTH link, NFC link, etc.). The wireless transmission module 350 can also format the received documents for data anonymization. For example, the wireless transmission module 350 can convert the received documents into XML. In some embodiments, the wireless transmission module 350 can perform one or more operations as described in the discussion of FIG. 5E.

FIGS. 4, 5A, 5B, 5C, 5D, 5E, 5F, and 6 are flow diagrams illustrating methods 400, 510, 520, 540, 560, 580, 590, and 600 for data anonymization in accordance with one or more aspects of the present disclosure. Method 400 presents an example process for data anonymization by a client device in accordance with some embodiments of the present disclosure. Methods 510, 520, 540, 560, and 580 illustrate example processes for collecting receipt information in accordance with some embodiments of the present disclosure. Method 590 illustrates an example process for generating anonymized documents in accordance with some embodiments of the present disclosure. Method 600 illustrates an example process for data anonymization by a server in accordance with some embodiments of the present disclosure.

Methods 400, 510, 520, 540, 560, 580, 590, and 600 may be performed by processing devices that can comprise hardware (e.g., circuitry, dedicated logic, programmable logic, microcode, etc.), executable code (such as is run on a general-purpose computer system or a dedicated machine), or a combination of both. Methods 400, 510, 520, 540, 560, 580, 590, and 600 and each of their individual functions, routines, subroutines, or operations can be performed by one or more processors of the computer executing the method. In certain implementations, methods 400, 510, 520, 540, 560, 580, 590, and 600 may each be performed by a single processing thread. Alternatively, methods 400, 510, 520, 540, 560, 580, 590, and 600 may be performed by two or more processing threads, each thread executing one or more individual functions, routines, subroutines, or operations of the method. In one example, the processing threads implementing methods 400, 510, 520, 540, 560, 580, 590, and 600 may be synchronized (e.g., using semaphores, critical sections, and/or other thread-synchronization mechanisms). Alternatively, the processes implementing methods 400, 510, 520, 540, 560, 580, 590, and 600 may be executed asynchronously with respect to each other.

For simplicity of explanation, the methods of this disclosure are depicted and described as a series of acts. However, acts in accordance with this disclosure can occur in various orders and/or concurrently with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states or events via a state or event diagram. It should also be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory-page media. In one implementation, methods 400, 510, 520, 540, 560, 580, 590, and 600 may be performed by computer system 100 as shown in FIG. 1.

Figure 4:
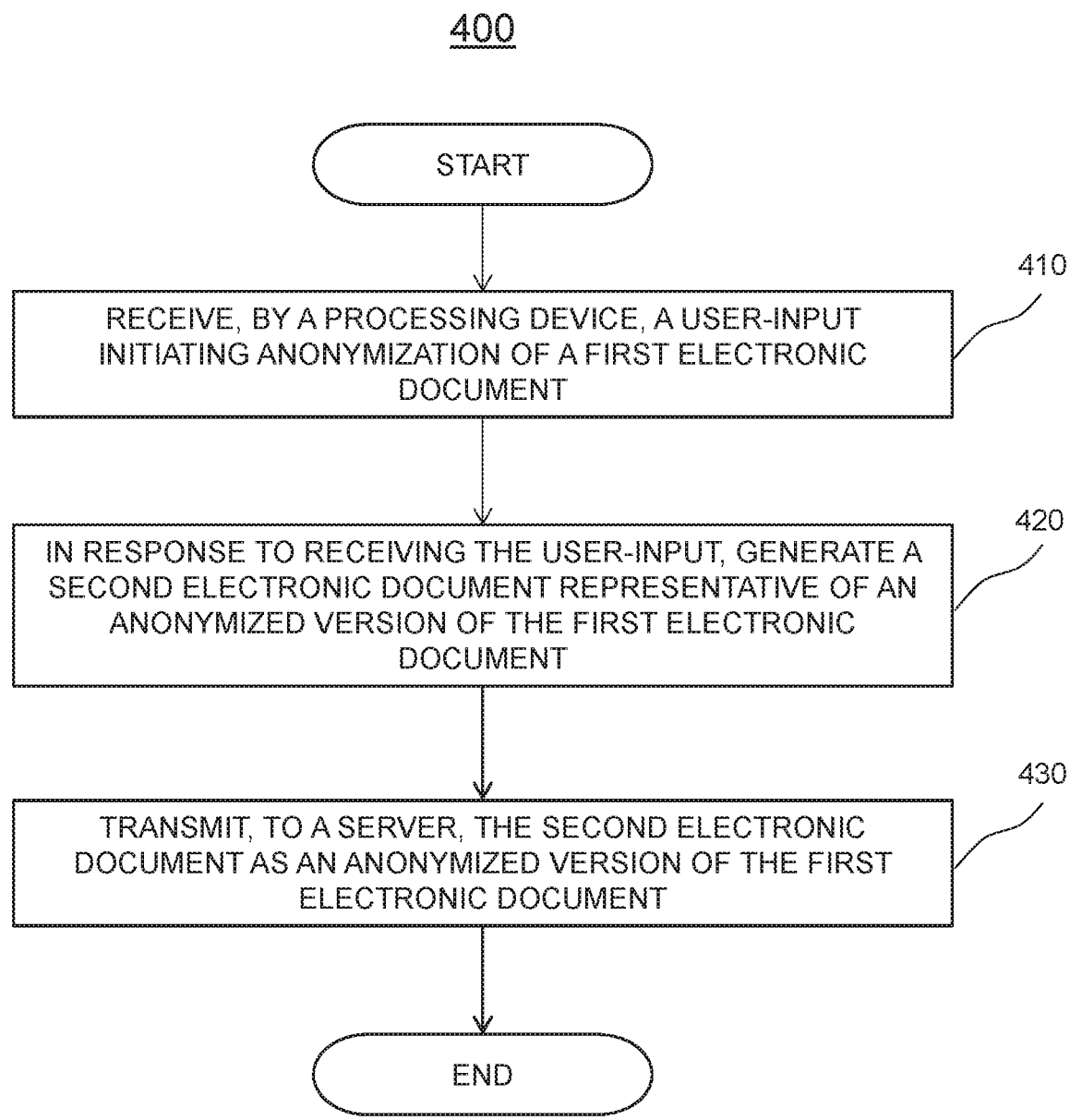
FIG. 4 is a flow diagram illustrating a method for data anonymization by a client device in a computer system in accordance with some embodiments of the present disclosure.

Referring to FIG. 4, method 400 can start at block 410 where the processing device may receive a user input initiating anonymization of a first electronic document. The first electronic document may include one or more data items. The user input may correspond to any input provided by a user that indicates a user request to initiate the anonymization of the first electronic document. The user input may be received, for example, from a client device. In some embodiments, the user input initiating the anonymization of the first electronic document may be received by performing one or more operations described in the discussion of FIGS. 5A-5E.

The first electronic document may be in a first-data format (e.g., an image, text, etc.). In some embodiments, one or more of the data items (also referred to as the "first data items") may include and/or relate to personally identifiable information. One or more of the data items (also referred to as the "second data items") do not include or relate to personally identifiable information.

At block 420, the processing device can generate a second electronic document that represents an anonymized version of the first electronic document. The second electronic document does not include any information related to the first-data item and thus does not include the personally identifiable information. The second electronic document may include a digital fingerprint of the first electronic document, a data identifier associated with each of the second data items, a timestamp associated with the first electronic document (e.g., a timestamp indicative of a purchase time of one or more purchased items), a user identifier associated with the user account, information indicative of the first-data format, and/or any other non-personally identifiable information related to the first electronic document. In some embodiments, the second electronic document may be generated by performing one or more operations as described in the discussion of FIG. 5F.

At block 430, the processing device can transmit to a server the second electronic document as an anonymized version of the first electronic document. The server may further anonymize the second electronic document (e.g., by performing one or more operations as described in the discussion of FIG. 6). The server may include the data anonymization component 135 of FIG. 1.

In some embodiments, the processing device can include elements for several input options that enable the user to provide receipt data: e.g., email, file browser, text entry, image capture, wireless communication device.

Figure 5A:
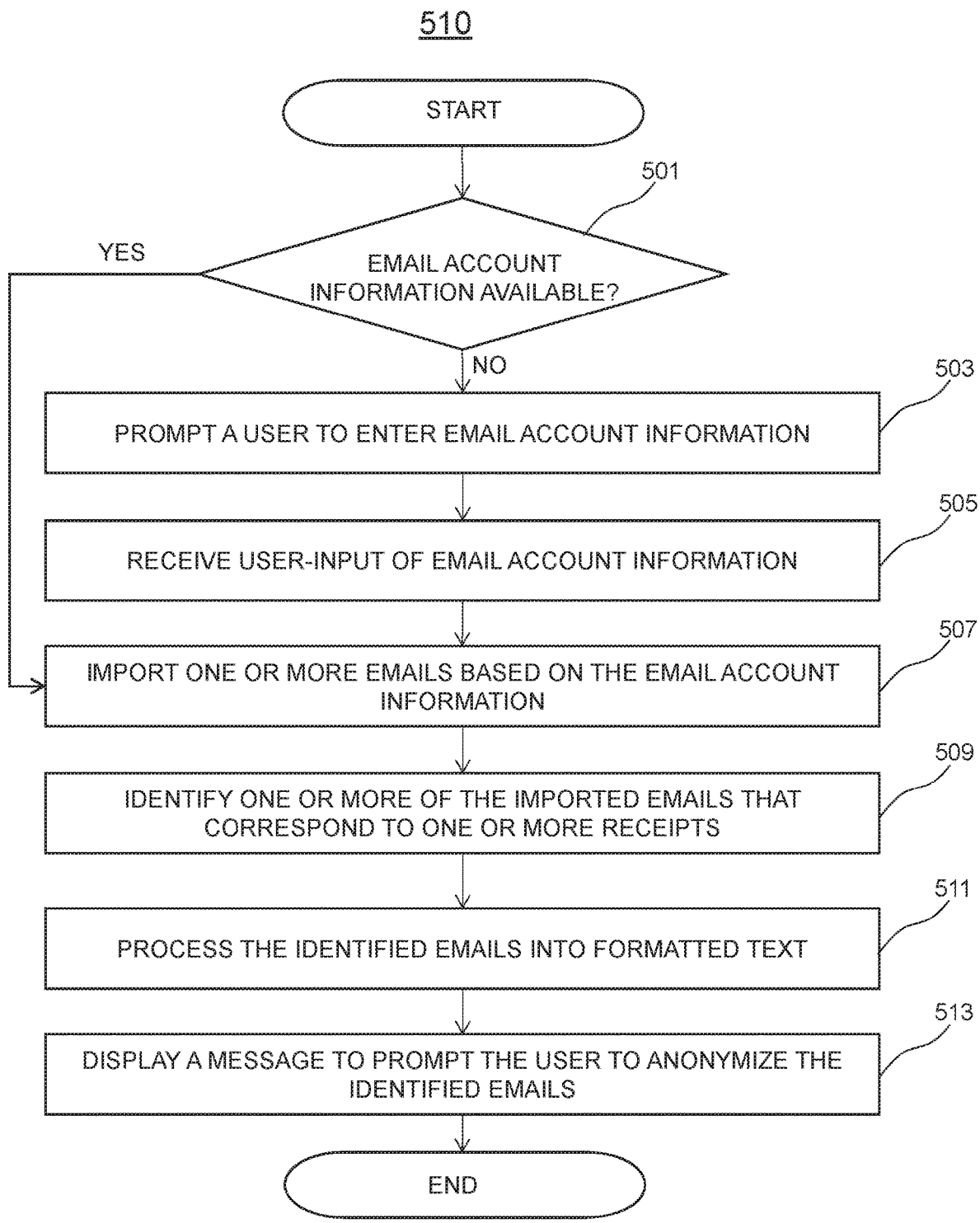
FIG. 5A is a flow diagram illustrating a method for data collection using an email module in accordance with some embodiments of the present disclosure.

In FIG. 5A, method 510 can start at block 501, where a processing device can determine whether email account information of a user is available for processing. For example, the processing device can determine that the user's email account information is available by finding that it is in a storage device accessible to the processing device.

If the processing device determines that a user's email account information is not available (e.g., "NO" at block 501), it can proceed to block 503 and prompt, via one or more user interfaces, the user to enter the email account information. The processing device can then receive one or more user inputs of the email account information at block 505.

In some embodiments, in response to determining that the email account information of the user is available (e.g., "YES" at block 501) and/or receiving the email account information, the processing device can proceed to block 507 and import one or more emails. For example, the processing device can communicate with an email server via an email protocol (e.g., SMTP, IMAP, or POP3, etc.) and retrieve emails associated with the email account information. In some embodiments, the processing device can retrieve the emails upon receiving a user input that indicates a request to retrieve the emails (e.g., a user selection of the "import" button in the user interface).

At block 509, the processing device can identify one or more of the imported emails that contain receipt information. For example, the processing device can sort the emails into emails with receipt data ("receipt emails") and emails without receipt data ("non-receipt emails"). In some embodiments, to sort the emails, the processing device can scan the emails for keywords associated with receipts (e.g., "receipt," "price," "total," "product," common product names, common merchant names, common merchant addresses, etc.). In response to determining that an imported email includes one or more keywords associated with receipts (e.g., a threshold number of keywords), the processing device can categorize the imported email as an email receipt.

At block 511, the processing device can convert the identified emails into a text format suitable for anonymization in accordance with the present disclosure. For example, the processing device can convert the emails into XML documents.

At block 513, the processing device can present one or more interfaces to prompt the user to anonymize the identified emails (e.g., the "receipt emails").

Figure 5B:
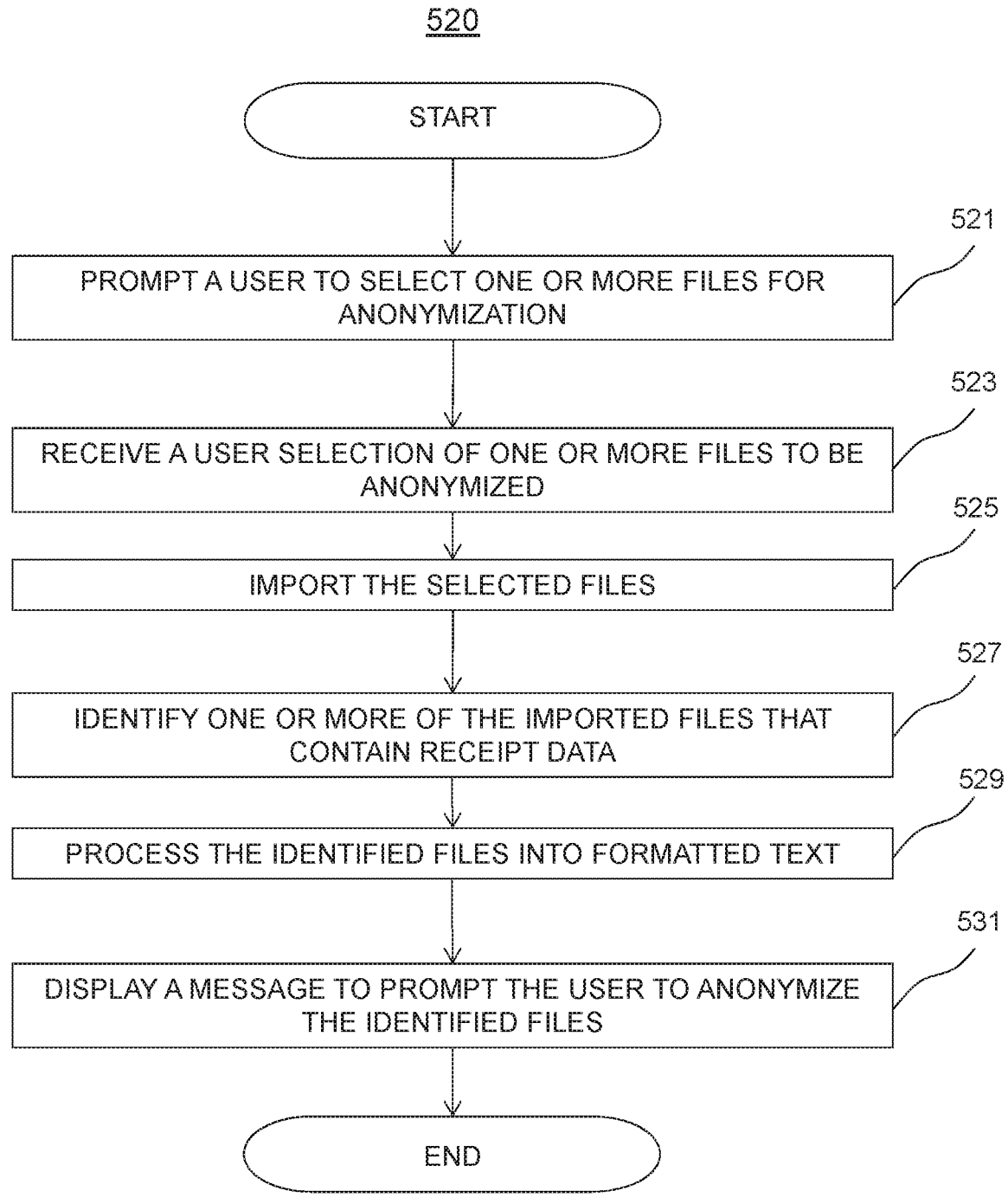
FIG. 5B is a flow diagram illustrating a method for data collection using a file import module in accordance with some embodiments of the present disclosure.

As shown in FIG. 5B, method 520 can start at block 521, where a processing device can prompt a user to select one or more files for anonymization. For example, the processing device can open a file browser and present a user interface on a client device (e.g., by using one or more operating system APIs). The file-browser user interface may include one or more elements (e.g., images, text, etc.) suitable for presenting file information. The files may be and/or include one or more files stored in a storage device associated with the client device (e.g., local memory, cloud storage, etc.). The file-browser user interface may include an element that prompts the user to select one or more files to import (e.g., an "import" button).

At block 523, the processing device can receive a user selection of one or more files to be anonymized. The processing device can also receive one or more user inputs to initiate the import of the files (e.g., a user selection of the "import" button in the file-browser user interface).

At block 525, the processing device can import the selected files. For example, the processing device can use one or more application program interfaces (APIs) provided by the client device's operating system and/or one or more applications running on the client device.

At block 527, the processing device can identify one or more of the imported files that contain receipt data. For example, the processing device can sort the imported files into files with receipts ("receipt files") and files without receipts ("non-receipt files"). In some embodiments, to sort the files, the processing device can scan the files for keywords associated with receipts (e.g., "receipt," "price," "total," "product," common product names, common merchant addresses, etc.). In response to determining that an imported file includes one or more receipt keywords (e.g., a threshold number of keywords), the processing device can categorize the imported file as a receipt file.

At block 529, the processing device can convert the identified files into a text format suitable for anonymization in accordance with the present disclosure. For example, it can convert the files into XML, documents.

At block 531, the processing device can present one or more interfaces to prompt the user to anonymize the identified files (e.g., the "receipt files").

Figure 5C:
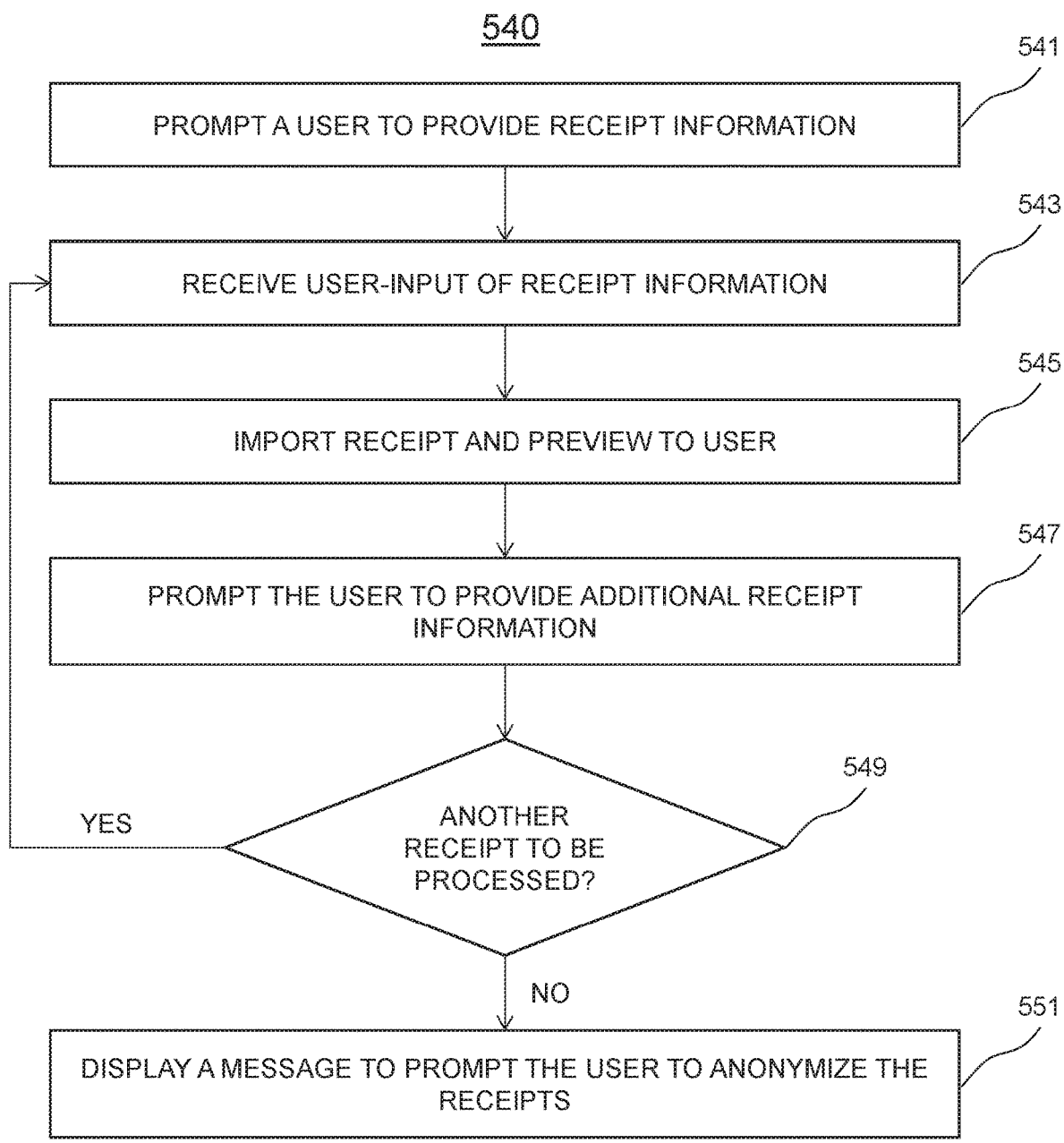
FIG. 5C is a flow diagram illustrating a method for data collection using a text entry module in accordance with some embodiments of the present disclosure.

As shown in FIG. 5C, method 540 can start at block 541, where a processing device can prompt a user to provide receipt information. For example, the processing device can present one or more user interfaces on a client device. Each of the user interfaces may contain text entry fields and/or any other user-interface elements suitable for entering information from one or more receipts (e.g., order items, product names, dates, merchant information, etc.). The user interfaces may also include one or more elements suitable for prompting a user to enter receipt information (e.g., an "enter" button).

At block 543, the processing device can receive receipt information from one or more user inputs. The user inputs can correspond to inputs provided by the user via the user interfaces presented at 541. The processing device can also present the received receipt information as preview information on the client device.

At block 547, the processing device can prompt the user to provide additional receipt information. For example, the processing device can present a user interface that prompts a user to indicate whether another receipt is to be entered.

In some embodiments, in response to receiving user input indicating that another receipt is to be entered, the processing device can loop back to block 543. Alternatively, after a number of seconds pass without a user-input, the processing device can proceed to block 551.

At block 551, the processing device can present one or more interfaces to prompt the user to anonymize the receipt information.

Figure 5D:
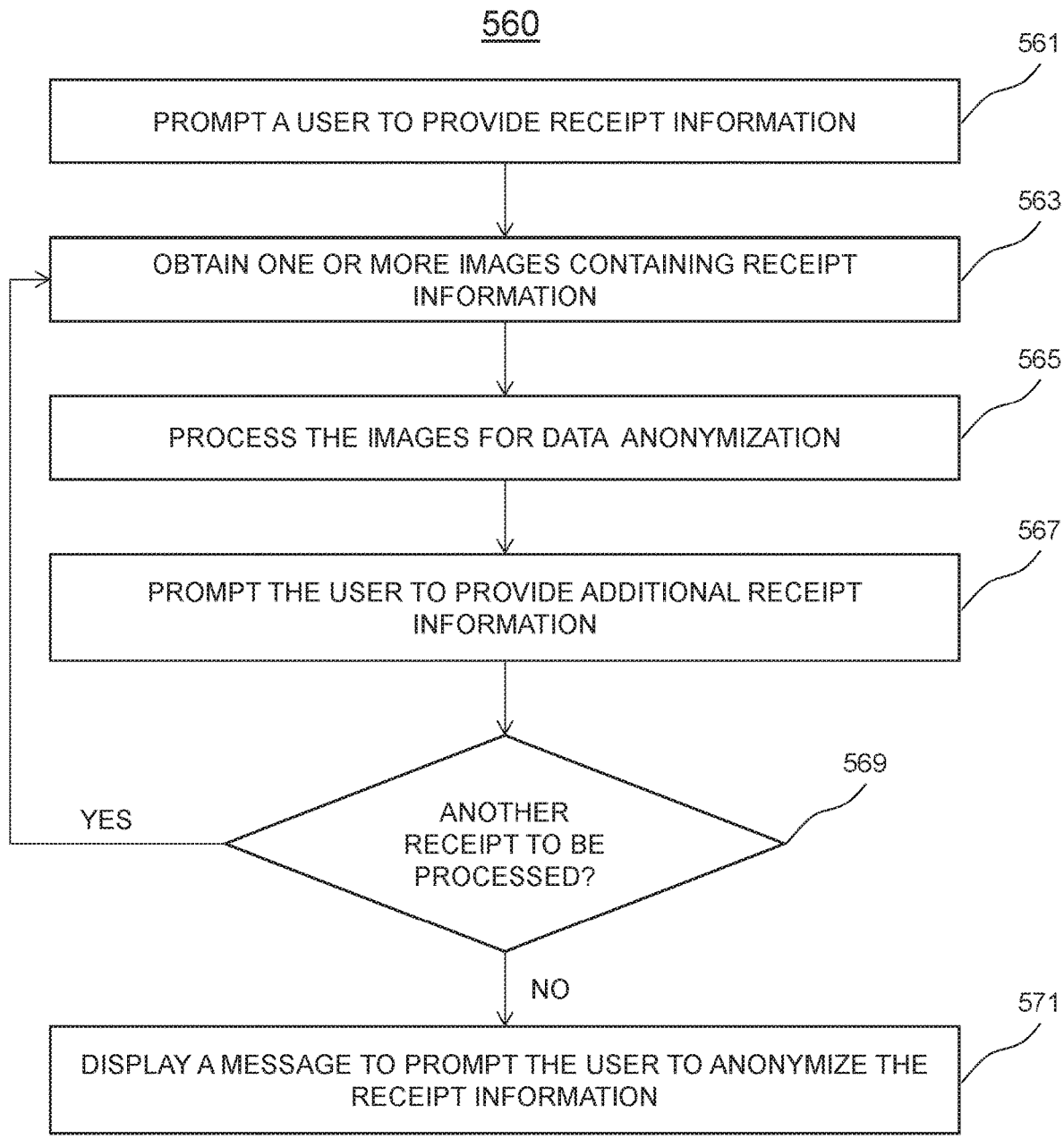
FIG. 5D is a flow diagram illustrating a method for data collection using an imaging module in accordance with some embodiments of the present disclosure.

In FIG. 5D, method 560 can start at block 561, where a processing device can prompt a user to provide receipt information. For example, the processing device can present one or more user-interfaces on a client device. Each of the user interfaces may contain one or more elements (e.g., buttons, images, graphics, text, etc.) suitable for prompting the user to enter receipt information.

At block 563, the processing device can obtain one or more images containing receipt information. In some embodiments, the processing device can obtain the images in response to receiving user input indicating that the receipt information is to be provided via images. For example, the processing device may obtain the images by converting a physical receipt (e.g., a hard copy of a receipt) into an image or other suitable electronic document using the image module 340 in FIG. 3. The processing device may also retrieve the images from a storage device accessible to it.

At block 565, the processing device can process the images for data anonymization. For example, the processing device can convert the images to a text document using OCR or any other techniques suitable for image-to-text conversion.

At block 567, the processing device can prompt the user to provide additional receipt information. For example, the processing device can present a user interface that prompts a user to indicate whether another receipt is to be entered.

In some embodiments, in response to receiving user input indicating the user is to enter information from another receipt, the processing device can loop back to block 563 and obtain additional images containing receipt information.

Alternatively, after a number of seconds pass without a user-input, the processing device can proceed to block 571.

At block 571, the processing device can present one or more interfaces to prompt the user to anonymize the receipt information.

Figure 5E:
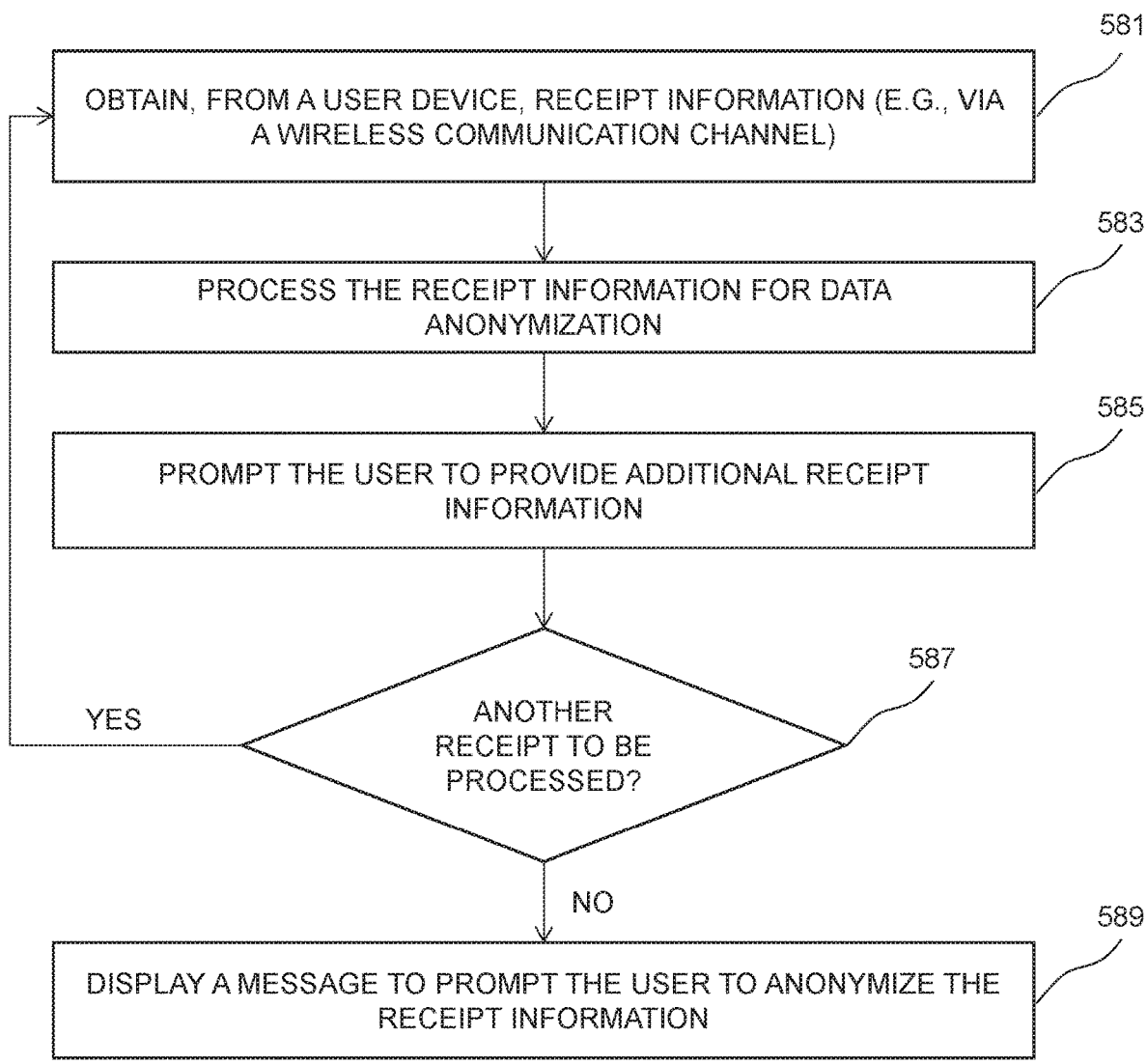
FIG. 5E is a flow diagram illustrating a method for data collection using a wireless communication module in accordance with some embodiments of the present disclosure.

In FIG. 5E, method 580 can start at block 581, where a processing device obtains receipt information from another device. In some embodiments, the receipt information is received via a wireless communication channel. For example, the processing device can use the client device's operating system APIs to access the client device's wireless networking capabilities, use the wireless networking capabilities to receive signals broadcast by a second device in a common wireless protocol, and then send and receive data that enables the second device to send a digital receipt to the client device.

At block 583, the processing device can process the receipt information for data anonymization. For example, the processing device can extract relevant text from the wireless message received by the processing device and convert the relevant text to a format suitable for anonymization.

At block 585, the processing device can prompt the user to provide additional receipt information. For example, the processing device can present a user interface that prompts a user to indicate whether another receipt is to be entered.

In some embodiments, in response to receiving input indicating the user is to provide another wireless receipt, the processing device can loop back to block 581 and receive additional receipt information. Alternatively, after a number of seconds pass without a user-input, the processing device can proceed to block 589.

At block 589, the processing device can present one or more interfaces to prompt the user to anonymize the receipt information.

Figure 5F:
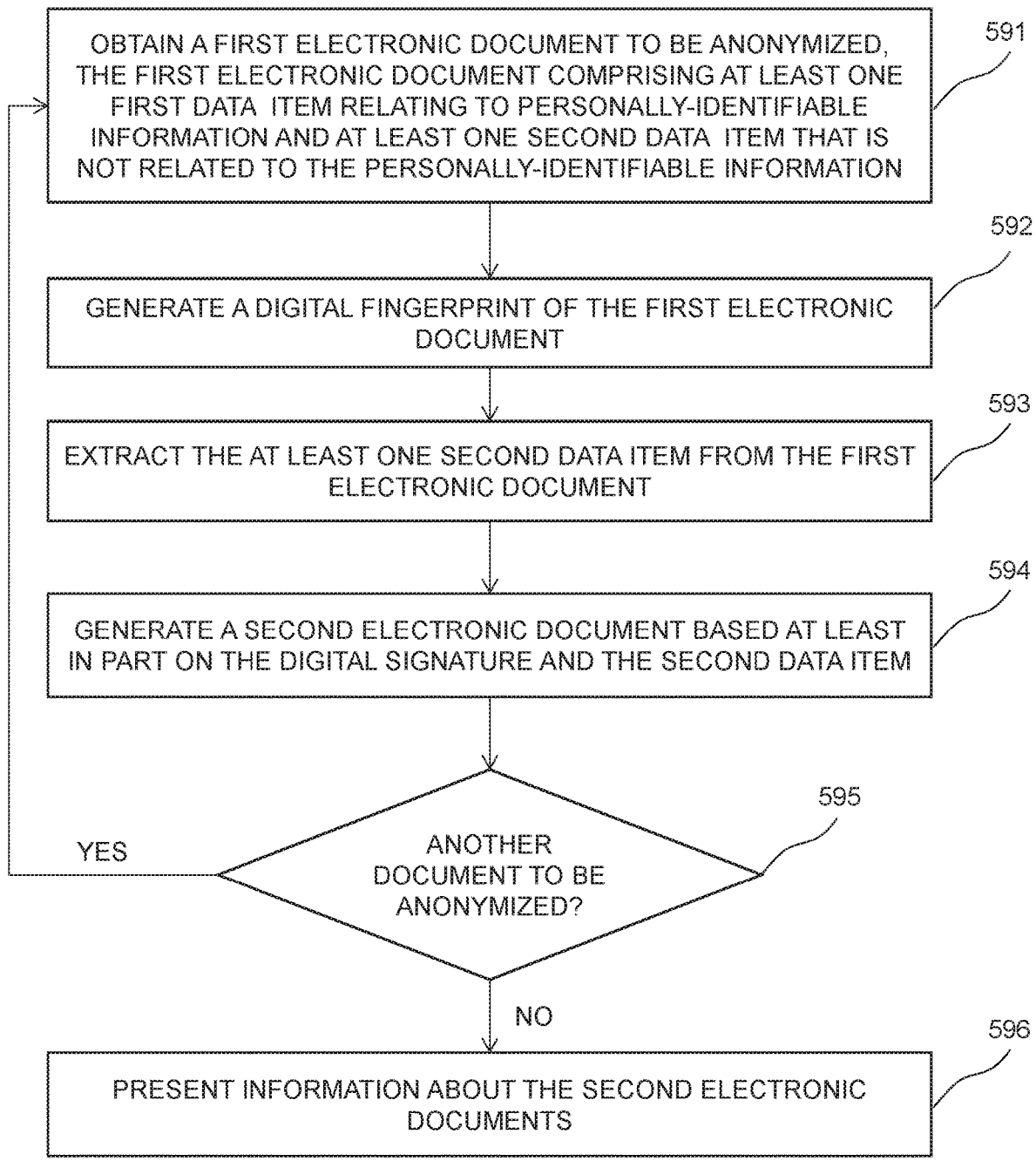
FIG. 5F is a flow diagram illustrating a method for generating anonymized documents in accordance with some embodiments of the present disclosure.

As shown in FIG. 5F, method 590 can start at block 591, where a processing device can obtain a first electronic document to be anonymized. The first electronic document may include receipt information and may be associated with a receipt identifier that uniquely identifies the receipt information. The first electronic document may include one or more first data items related to personally identifiable information and one or more second data items not related to personally identifiable information. For example, the personally identifiable information may be credit card information, usernames, email addresses, physical addresses, etc. The first electronic document may include receipt information and may be obtained by performing one or more operations as described in the previous discussion of FIGS. 5A-5E. The first electronic document can be in a particular data format (also referred to as the "first data format"). Examples of the first data format may include "email," "file," "text," "image," etc. The first data format may correspond to a particular data-collection module used to acquire the first electronic document (e.g., one or more modules illustrated in FIG. 3). In some embodiments, the first electronic document may be converted into a second data format that is machine-readable (e.g., text, XML, etc.).

At block 592, the processing device can generate a digital fingerprint of the first electronic document. The digital fingerprint can represent one or more digital features of the first electronic document (e.g., one or more feature vectors of the features) that may be used to identify the first electronic document. Different digital fingerprints can be generated for different electronic documents and can be used to uniquely identify the electronic documents. The digital fingerprint of the first electronic document may be generated using any suitable fingerprinting algorithms. For example, the digital fingerprint may be generated using a fingerprinting algorithm that maps one or more portions of the first electronic document (e.g., one or more of the second data items) to one or more data items of a smaller amount of data. The fingerprinting algorithm may be, for example, a hash function.

At block 593, the processing device can extract the one or more second data items from the first electronic document. The processing device can extract the second data items from the first electronic document based on one or more data identifiers associated with the second data items. The data identifiers can be used to identify second data items based on characteristics and patterns that distinguish the second data items from the first data items, e.g., where they are located on a receipt (e.g., at the top or bottom or relative to first-data items such as a credit card number).

At block 594, the processing device can generate a second electronic document based at least in part on the digital fingerprint and the second data items. The second electronic document may be and/or include a combination of the digital fingerprint and the second data items. The second electronic document may also include a timestamp associated with the first electronic document (e.g., receipt creation time), an identifier associated with a user's account, the data identifiers of the second data items, the first data format, the invoice/order number from the first electronic document, etc. The second electronic document may not include information related to the at least one first data item and thus may not include any personally identifiable information.

At block 595, the processing device can determine whether more documents are to be anonymized. In some embodiments, in response to determining that additional documents are to be anonymized, the processing device can loop back to block 591 and process an additional document. Alternatively, in response to determining that no more documents are to be processed, the processing device can proceed to block 596 and present information about the second electronic documents.

Figure 6:
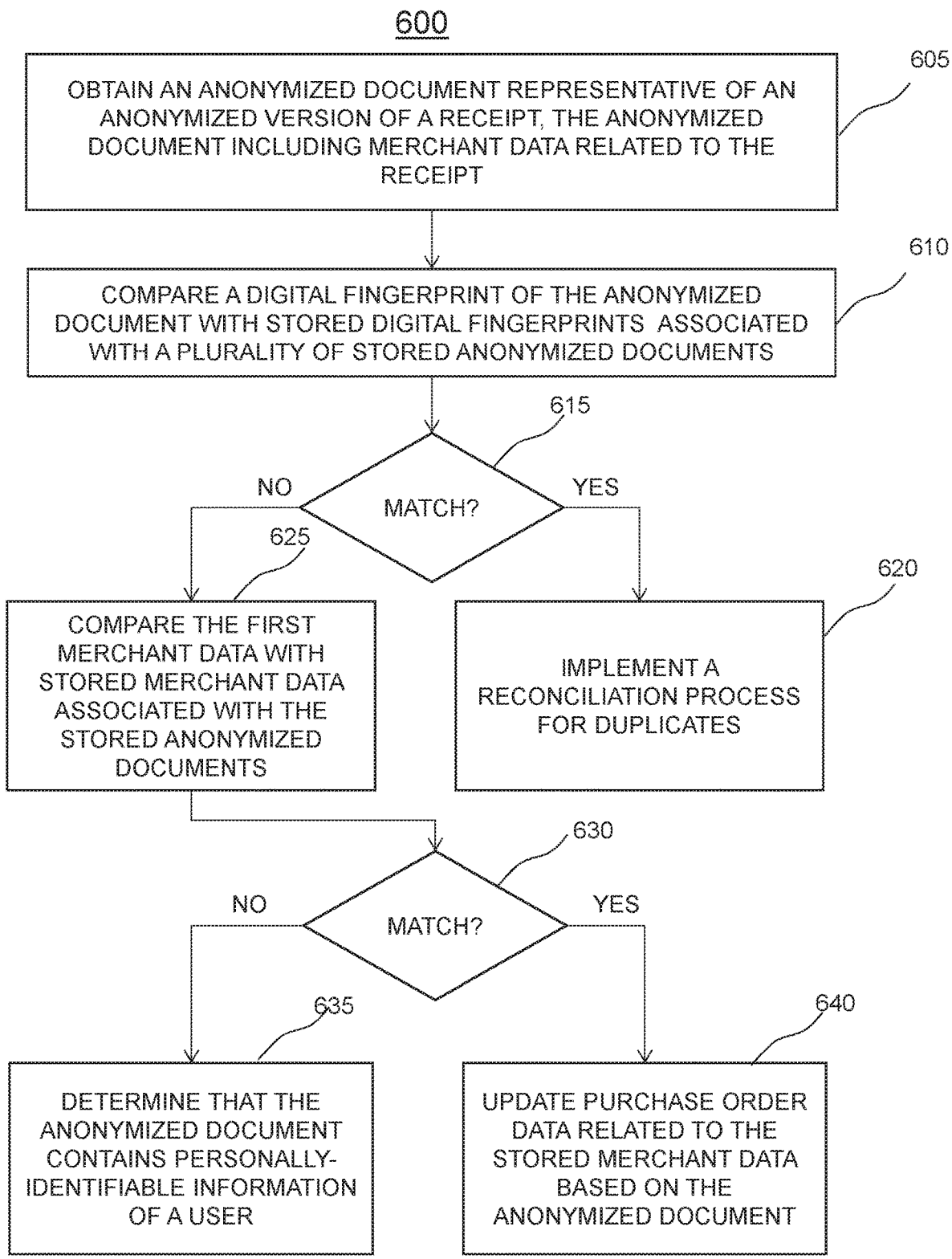
FIG. 6 is a flow diagram illustrating a method for data anonymization by a server in accordance with some embodiments of the present disclosure.

In FIG. 6, method 600 can start at block 605, where a processing device can obtain an anonymized document that represents an anonymized version of a receipt. The anonymized document may include merchant data related to the receipt (also referred to as the "first merchant data"). The first merchant data may include, for example, a merchant address, name, etc. The anonymized document may be produced in accordance with FIGS. 2-5F above.

At block 610, the processing device can compare a digital fingerprint associated with the anonymized document (also referred to as the "first digital fingerprint") with stored digital fingerprints of stored anonymized documents. Each of the digital fingerprints may represent one or more features of one of the stored anonymized documents.

At block 615, the processing device can determine whether the first digital fingerprint matches at least one of the stored digital fingerprints. The difference may be determined using any suitable metric for measuring similarities between two digital fingerprints. In response to determining that a difference between the first digital fingerprint and the given stored digital fingerprint is not greater than a threshold, the processing device can determine that the first digital fingerprint matches a given stored digital fingerprint. In some embodiments, in response to determining that the first digital fingerprint matches one or more of the stored digital fingerprints, the processing device can proceed to block 620 and implement a reconciliation process for duplicates.

In some embodiments, in response to determining that the first digital fingerprint does not match any of the stored digital fingerprints, the processing device can proceed to block 625. At block 625, the processing device can compare the first merchant data with the stored merchant data associated with the stored anonymized documents. At block 630, the processing device can determine whether the first merchant data matches at least a portion of the stored merchant data. In response to determining that a difference between the first merchant data and the given portion of the stored merchant data is not greater than a threshold, the processing device can determine that the first merchant data matches a given portion of the stored merchant data. The difference may be determined using any suitable metric for measuring similarities between merchant data. For example, first merchant data may be regarded as matching certain stored merchant data when the merchant name of the first merchant data matches the merchant name of the stored merchant data. In some embodiments, in response to determining that a difference between the first merchant data and the given portion of the stored merchant data is greater than a threshold, the processing device can proceed to block 635. At block 635, the processing device can determine that the anonymized document contains a user's personally identifiable information, and in response, the processing device can implement a reconciliation process. For example, the processing device can send one or more messages to a client device to alert the user that the anonymized document contains personally identifiable information.

Alternatively, in response to determining that the first merchant data matches one or more portions of the stored merchant data (the "matching merchant data"), the processing device may proceed to block 640. At block 640, the processing device can use the anonymized document to update the stored merchant data. For example, the processing device can create a data set of purchased items on a receipt based on the first anonymized document. The data set may include the first merchant data. In some embodiments, the processing device can extract from the first anonymized document, data about the purchased item, such as name, price, timestamp, etc. The data set of the purchased item may include the extracted data about the purchased item.

In some embodiments, the data set of the purchased item may include a rating score of the authenticity of the receipt. For example, the processing device can use the source of the receipt (e.g., the type of data-collection module from which the receipt was obtained) to rate the receipt's authenticity. The anonymized document may include information about the data source. In some embodiments, the purchase order data can be updated by performing one or more operations described in the discussion of FIG. 8.

Figure 7:
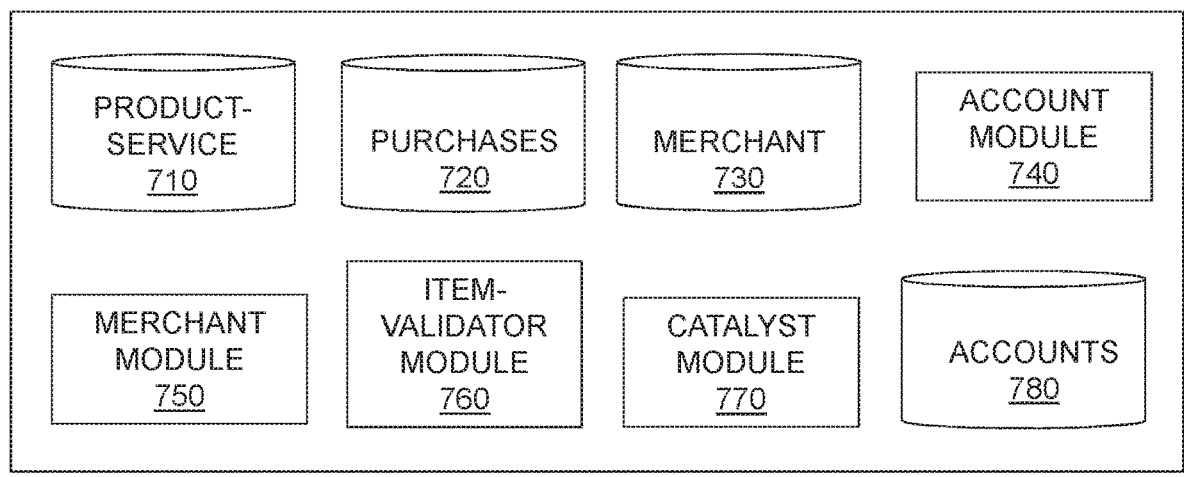
FIG. 7 is a block diagram of a detailed view of a computer system implementing a data anonymization component of a server in accordance with some embodiments of the present disclosure.

FIG. 7 is an example of a data anonymization component 135 in accordance with some embodiments of the present disclosure. The data anonymization component 135 may include a product-service data store 710, purchase data store 720, merchant data store 730, account module 740, merchant module 750, item-validator module 760, catalyst module 770, account store 780, and/or any other suitable component for implementing various embodiments of the present disclosure.

The product-service data store 710 may store data about products and/or services related to receipt information. The purchase data store 720 may store data about purchased items, such as names, prices, product categories, etc. The purchased items may include one or more items previously processed by the data anonymization component 135. The purchase data store 720 can also save identifications of anonymized documents (e.g., receipt identifications).

The merchant data store 730 can store data about merchants, such as merchant names, addresses, products sold, etc.

The account module 740 can receive anonymized documents for processing. The anonymized documents can be generated by performing one or more operations described in the discussion of FIGS. 4-5F above. The account module 740 can also receive, generate, transmit, etc. user preferences for how data is presented. For example, one user preference could be that data related to a particular purchased item is viewable to merchants, but not to other users.

The merchant module 750 can manage and/or process merchant data. For example, the merchant module 750 can extract merchant data from anonymized documents generated based on receipt information and update the merchant data store 730. The merchant module 750 can serve as an interface for updating data in the merchant data store 730 that pertains to the merchant's account. The module can receive data correlations that can be created by the catalyst module 770 from data in the purchases 720 and product-service 710 data stores. Through the merchant module 750, merchants with accounts can use these data correlations to send information to users. The merchant module 750 can restrict merchant access to user data that may serve as a unique identifier of a user or users. For example, a merchant may have a user's personally identifiable information in a third-party system and a unique identifier of that user, such as the only purchaser of X, Y, and Z. A merchant may be interested in using the merchant module to accumulate more data on this user. To prevent a merchant from using a unique identifier to acquire a user's data without the user's permission, the merchant module 750 can use sales data from the product-service data store 710 to calculate the probability of a unique identifier and restrict a merchant from using such an identifier to elicit user data without a user's permission.

The item-validator module 760 can process an anonymized document that represents the anonymized version of one or more receipts. For example, the item-validator module 760 can check documents with anonymization concerns (e.g., by identifying potential personally identifiable information in the anonymized document). The item-validator module 760 can also rate the authenticity of an anonymized document. The item-validator module 760 can generate a data set for each item in the anonymized document. In some embodiments, the module 760 can perform one or more operations described in the discussion of FIG. 8 below.

The catalyst module 770 can correlate a user's data with data from other users and merchants. For example, these correlations may be performed using machine learning and pattern recognition techniques (e.g., Bayesian algorithms, support-vector machines, etc.). The catalyst module 770 can then present these correlations to users or merchants.

Figure 8:
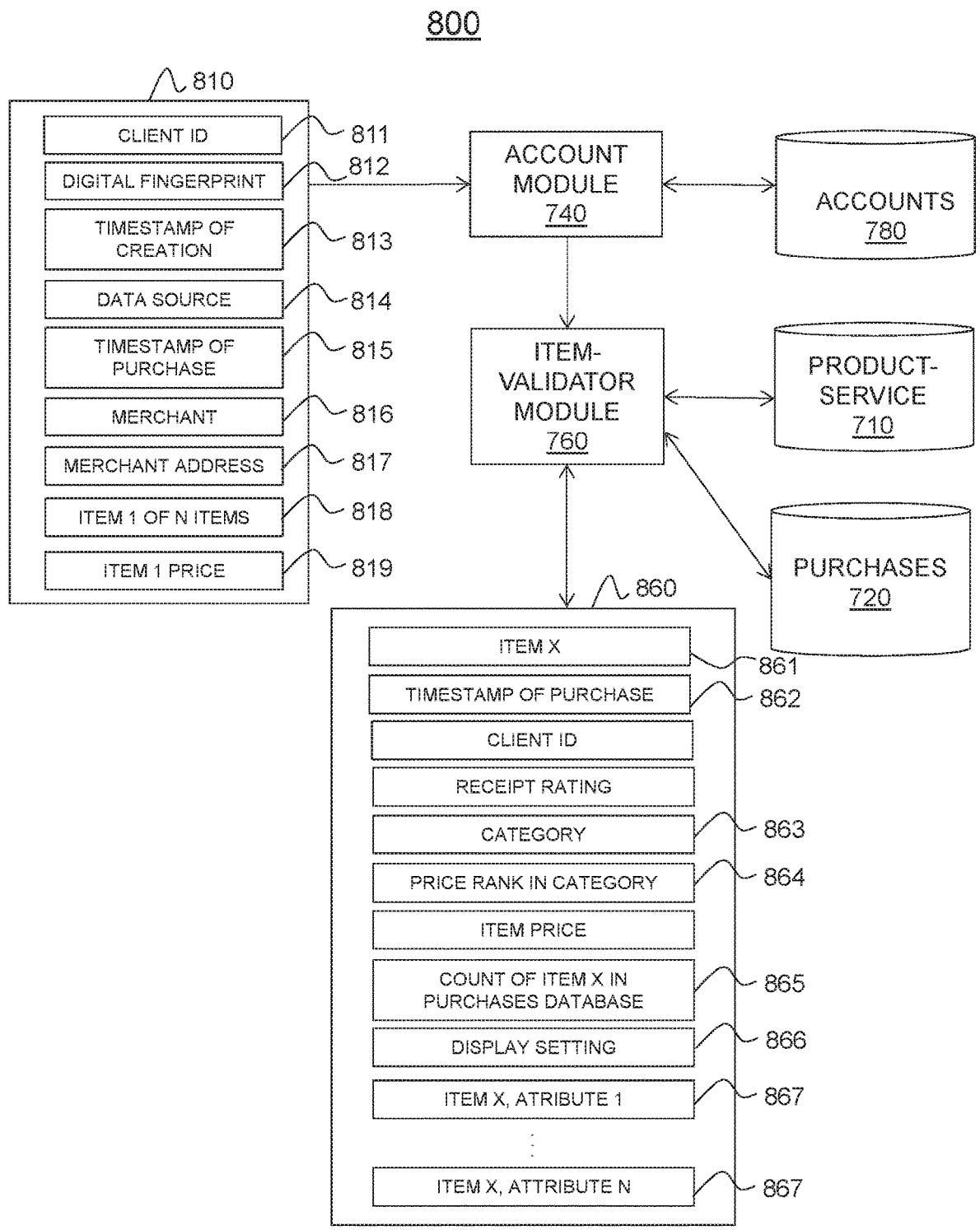
FIG. 8 is a schematic diagram illustrating a mechanism for data anonymization using a data anonymization component in accordance with some embodiments of the present disclosure.

FIG. 8 is an example of a data anonymization component 800, in accordance with some embodiments of the present disclosure. As described in the discussion of FIGS. 2-6 above, the account module 740 can receive an anonymized document 810 generated from an electronic document that includes receipt information (e.g., an email, image, etc.). The anonymized document 810 can include one or more data items, such as a client ID 811, digital fingerprint 812, creation timestamp 813, data source 814, purchase timestamp 815, merchant data (e.g., name 816, address 817, etc.), data about purchased items (e.g., names 818, purchase prices 819, etc.), etc. The data source 814 may indicate which type of data-collection module was used to obtain the receipt information 810 (e.g., one or more of the email module 310, file import module 320, text-input module 330, imaging module 340, and wireless transmission module 350 of FIG. 3).

The item-validator module 760 can receive the anonymized document 810 and/or any other data from the account module 740. The item-validator module 760 can compare the digital fingerprint 812 with one or more digital fingerprints stored in the purchase data store 720. The digital fingerprints may be associated with one or more anonymized documents and/or receipts previously processed by the data anonymization component 135. The item-validator module 760 may determine whether the digital fingerprint 812 matches one or more of the stored digital fingerprints. In some embodiments, in response to determining that the digital fingerprint 812 matches a stored digital fingerprint, the item-validator module 760 can mark the anonymized document 810 as a duplicate. The item-validator module 760 can also implement a reconciliation process for duplicates. For example, the item-validator module 760 can send to a client device that uploads the anonymized document, one or more messages indicating that the anonymized document 810 is a duplicate. The item-validator module 760 can also flag items and other information so they are not displayed to other users.

In some embodiments, in response to determining that the digital fingerprint 812 does not match any of the stored digital fingerprints, the item-validator module 760 can determine whether the anonymized document 810 contains personally identifiable information. If the item-validator module 760 finds personally identifiable information in an anonymized document 810, the item-validator module 760 may indicate merchant-user identification errors, for example, from mistakenly loading user information as merchant information. The item validator-module 760 can compare the merchant data contained in the anonymized document 810 (e.g., merchant name 816, address 817, etc.) with merchant data stored in the merchant data store 710. The stored merchant data may include authenticated data from known merchants.

In some embodiments, in response to determining that the merchant data in the anonymized document 810 does not match any stored merchant data, the item validator module 760 may determine that the anonymized document 810 includes personally identifiable information. The item validator module 760 may also initiate a reconciliation process. For example, the item validator module 760 can prompt a user to confirm whether the merchant data includes personally identifiable information (e.g., by sending one or more messages to a client device associated with the user).

In some embodiments, in response to determining that the merchant data in the anonymized document matches one or more portions of the stored merchant data, the item-validator module 760 may update a counter associated with the matching merchant data. The counter may store the number of times a certain merchant, purchased item (e.g., product, service, etc.), or category of purchased items (e.g., products or services related to "sports equipment") has occurred in the stored merchant data. The item-validator module 760 can update the counter by increasing its value. For example, if item X is a baseball, the item-validator module 760 can increase by 1 the value of the counters corresponding to "baseball" and "sports equipment" in the purchase data store 720.

The item-validator module 760 can also rate the authenticity of the anonymized document 810. For example, the item-validator module 760 can assign a particular score to the anonymized document 810 based on the data source 814. In some embodiments, various scores may be assigned to anonymized documents associated with various data source modules. For example, as the text-input module 330 does not process third-party indicators of a document's validity, an anonymized document associated with a text format (e.g., a document generated from receipt information entered via the text-input module 330 of FIG. 3) would receive a lower score than an anonymized document associated with a wireless data source or an email data source (e.g., a document generated from receipt information entered via the wireless transmission module 350 or the email module 310).

The item validator module 760 can extract data items from the anonymized document 810 (e.g., the client ID 811, digital fingerprint 812, creation timestamp 813, data format 814, purchase timestamp 815, merchant data (e.g., merchant name 816, address 817, etc.), purchased-item data (e.g., product names 818, purchase prices 819, etc.) etc.). The item validator module 760 can then use the extracted data to generate a data set 860 containing one or more of the purchased items. The data set 860 may also include one or more of the extracted data items, a description of a purchased item 861, purchase timestamp 862, purchased-item category 863, price-rank category 864, count value 865, display setting 866, one or more purchased-item attributes 867, etc. The description of the purchased item 861 can be a name or any other subset of descriptive terms (e.g., "baseball"). The purchased-item category 863 can be a group of products and/or services that the purchased item 861 may belong to (e.g., "sports equipment," "office supplies," etc.). The item validator-module 760 can change the display settings 866 for the item 861 based on user preferences stored in accounts 780. The item validator-module 760 can also generate a timestamp for purchase 862 from the timestamp of purchase 815 (e.g., by applying a mask to timestamp 815). This timestamp mask scrambles the purchased item's actual purchase time. Although the anonymization component 800 has access to purchase timestamp 815, the actual purchase time 815 is not accessible to other users, stored, or transmitted to any other device. Appling the timestamp mask to the timestamp 815 may further protect users' privacy.

The item-validator module 760 can then check for items that may uniquely identify the user. If it finds any items, the item-validator module 760 can flag them so they are hidden from other users, which protects against user de-anonymization. If the item-validator module 760 finds items that are not unique, but become unique when combined with another item or located in a particular geographic region, it can also flag them so they are hidden from other uses, which further protects against user de-anonymization.

After the data set 860 is generated, the item-validator module 760 can store it in the purchase data store 720. The item-validator module 760 can iteratively process and store receipt data until all a user's newly uploaded data has been processed and stored. After the item-validator module 760 stores a user's receipt data, the catalyst module 770 can correlate it with other user and merchant-store data. The correlation may be performed using simple or advanced techniques; for example, machine learning and pattern recognition (e.g., Bayesian algorithms, support vector machines, etc.). The catalyst module 770 can then present these correlations to all users who have chosen to receive them.

Figure 9:
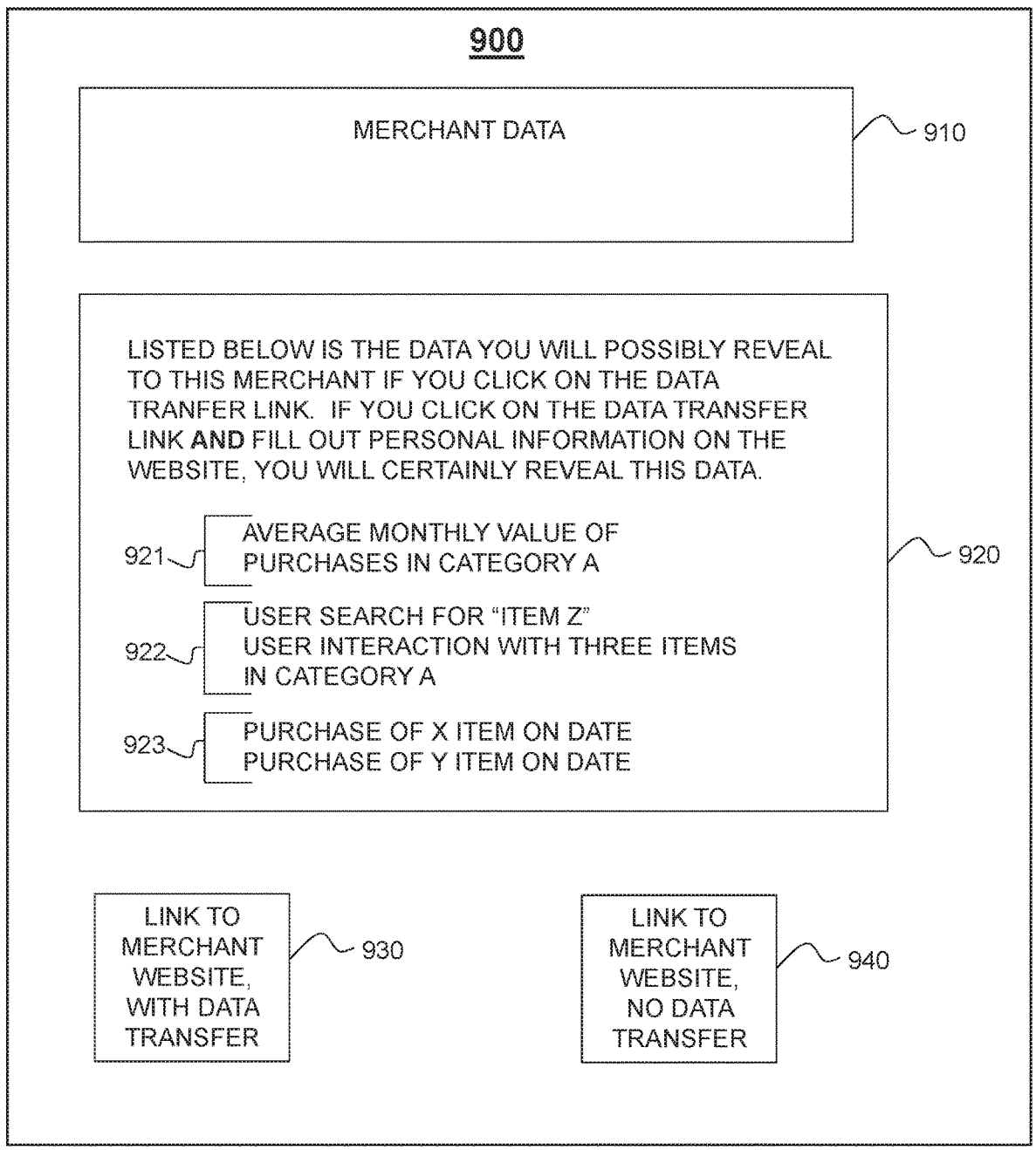
FIG. 9 is a schematic diagram illustrating an example of a user interface in accordance with some embodiments of the present disclosure.

FIG. 9 is an example of a user-interface 900 in accordance with some embodiments of the present disclosure. The user-interface 900 may include one or more merchant-data interface elements 910 for presenting merchant data. Each element 910 may include text, images, audio data, video data, etc. In some embodiments, the merchant data may include an advertisement. The data-anonymization mechanisms disclosed herein (e.g., data-anonymization application 115, data-anonymization component 135, etc.) can enable users to interact with the merchant-data interface element 910 without revealing personally identifiable information.

User interface 900 may also include one or more elements that allow users to choose whether they want to transfer their data to merchant websites. For example, user interface 900 may include an element 940 that gives users the option to withhold their data from a merchant website. Element 940 may send users to a merchant website without using an HTML referrer tag or to a specific page the merchant uses to track the ad. User interface 900 may also include an element 930 that gives users the option to transfer their data to a merchant website. If a user selects element 930, user interface 900 may respond by presenting data-disclosure statement 920. This disclosure statement can specify which user data may be disclosed to a merchant if the user selects element 930. In the example user-interface 900, transferred data can include the data described by elements 921, 922, and 923. The data transfer may be achieved using various techniques. In some embodiments, element 930 may contain an HTML referrer header specifying the merchant message to which the user is responding. Selecting user-interface element 930 may also direct users to a merchant website that tracks which users respond to the ads merchants place. If the user-tracker website has recorded a user's identity, for example through cookies, then selecting element 930 may unite the data from elements 921, 922, and 923 with the website's record of the user's identity. If the website has there is no record of the user's identity, this union of 921, 922, and 923 and the user's identity may occur when the user submits personally identifiable information on the purchase-page of the merchant-website. Throughout this process,— user-data connected to personally identifiable information submitted on a third-party website cannot be transferred from the client device without the anonymous user's permission.

The data-disclosure statement 920 shows three examples of data users can transfer to merchants by selecting element 930. First, catalyst module 770 can average purchases in Category A to create a combination of user data 921, then add the results to the rest of the user data. Second, client device 922 can track users' actions, then add the results to the rest of the user data. Third, server 923 can record user uploads, then add the results to the rest of the user data. If users want to withhold any of these three kinds of data from merchants, they can select the merchant-website link without data-transfer element 930, which allows them to be targeted by a merchant advertisement and respond to it without revealing the targeting information to the merchant.

Selection of either 930 or 940 may be followed by a user purchasing an item from a merchant and the merchant sending the user an email receipt of this purchase. A data collection module in FIG. 3 may subsequently process that email receipt, send it to the server 130, which may post the anonymized data (also referred to as "ad-responsive anonymized data") to the user's account. If this ad-responsive anonymized data is displayed immediately to other user accounts or through the merchant module 750, it might reveal to the merchant the user account associated with a purchase on the merchant's website and therefore might reveal other data in that user's account without the user's authorization. For this reason, the display of the ad-responsive anonymized data requires additional anonymization procedures to safeguard against ad-responsive anonymized data being, for the merchant who set the ad, a unique identifier of an ad-responsive user.

In one example procedure, the user's selection of 930 or 940 can be stored in the accounts data store 780 with a flag to treat an anonymized receipt from the merchant as ad-responsive anonymized data. The display data categorized as ad-responsive anonymized data can be delayed until a sufficient number of ad responses occur and display no longer serves as unique identifier. In circumstances where a time-delay is insufficient because there are a limited number of users who respond to an ad, ad-responsive data may be displayed through differential anonymization. For example, the information may be displayed as a probability of purchase across many user accounts rather than one identifiable account.

Figure 10:
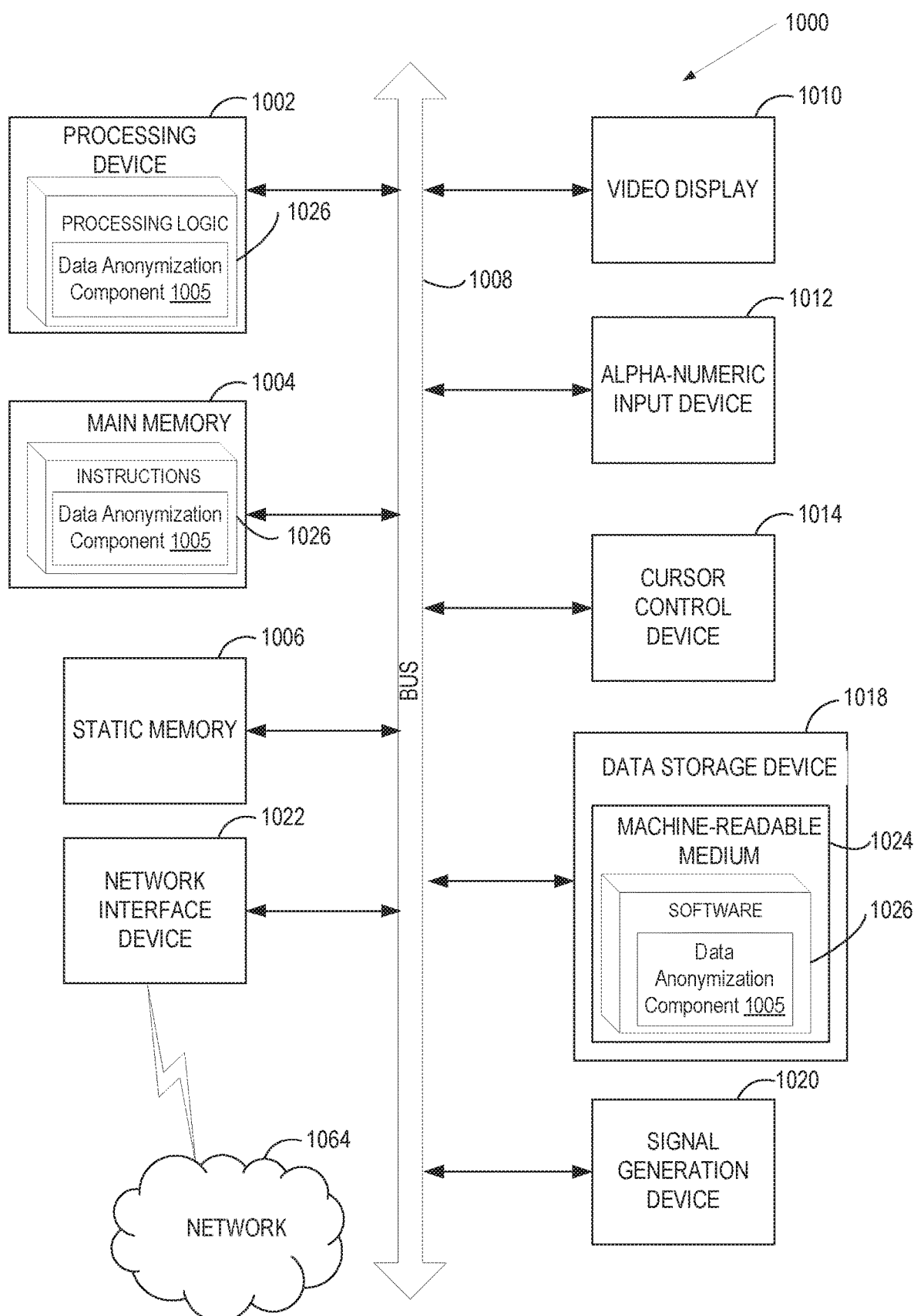
FIG. 10 is a block diagram of one implementation of a computer system.

FIG. 10 is a representation of a machine in the form of a computer system 1000 within which a set of instructions may be executed for causing the machine to perform any one or more of the methodologies discussed herein. In alternative embodiments, the machine may be connected (e.g., networked) to other machines in a LAN, intranet, extranet, or the Internet. The machine may operate in the capacity of a server or client device in a client-server network environment or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1000 includes a processing device 1002 (e.g., processor, CPU, etc.), a main memory 1004 (e.g., read-only memory (ROM), flash memory, dynamic random access memory (DRAM) (such as synchronous DRAM (SDRAM) or DRAM (RDRAM), etc.), a static memory 1006 (e.g., flash memory, static random access memory (SRAM), etc.), and a data storage device 1018, which communicate with each other via one or more buses 408.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 1000 may further include a network interface device 1022 communicably coupled to a network 1064. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1018 may include a machine-accessible storage medium 1024 where software 1026 is stored embodying any one or more of the methodologies for functions described herein. The software 1026 may also reside, completely or at least partially, within the main memory 404 as instructions 1026 and/or within the processing device 1002 as processing logic 1026 during execution thereof by the computer system 1000; the main memory 1004 and the processing device 1002 also constituting machine-accessible storage media.

The machine-readable storage medium 1024 may also be used to store instructions 1026 to implement a data anonymization component 1005 to perform data anonymization. The data anonymization component 1005 may be and/or include the data anonymization application 115 and/or the data anonymization component 135 as described with respect to FIGS. 1-3, and/or a software library containing methods that call the above applications. While the machine-accessible storage medium 1024 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the disclosure. The term "machine-accessible storage medium" shall accordingly be taken to include, but not be limited to, solid-state memories and optical and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "invoking," "associating," "providing," "storing," "performing," "detecting," "initiating," "obtaining," "generating," "determining," "updating," "modifying," "rating," "anonymizing," or the like, refer to actions and processes performed or implemented by computer systems that manipulate and transform data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general-purpose computer system selectively programmed by a computer program stored in the computer system. Such a computer program may be stored in a computer-readable tangible storage medium.

The methods and illustrative examples described herein are not inherently related to any particular computer or other apparatus. Various general-purpose systems may be used in accordance with the teachings described herein, or it may prove convenient to construct more specialized apparatus to perform methods 400, 510, 520, 540, 560, 580, 590, and 600 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method to share and control data with enhanced data anonymization comprising:
   receiving, by a processing device of a client device, a user input initiating posting of transaction data processed by an enhanced data anonymization process as an anonymized version of unprocessed transaction data, wherein the unprocessed transaction data is in an electronic document, and wherein the unprocessed transaction data comprises at least one set of data corresponding to a transaction, the at least one set of data comprising:
      at least one first data item comprising information that is personally identifiable information of a user;
      at least one second data item comprising information that is not personally identifiable information of the user;
   in response to the user input, generating, by the processing device of the client device, an anonymized version of the set of data corresponding to the transaction by applying the enhanced data anonymization process comprising:
      extracting the at least one second data item from the unprocessed transaction data;
      creating a digital fingerprint of the electronic document, the digital fingerprint excluding the at least one first data item; and
      generating a new document and writing the extracted at least one second data item and the digital fingerprint to the new document; and
   in response to the user input, posting, by the processing device of the client device to a server, the anonymized version to enable the user to share and control the posted anonymized version with enhanced anonymization.

2. The method of claim 1, wherein the unprocessed transaction data comprises a purchase receipt.

3. The method of claim 1, wherein the anonymized version of the set of data further comprises a timestamp associated with the unprocessed transaction data.

4. The method of claim 1, wherein the anonymized version of the set of data further comprises a user identifier associated with an account of the user.

5. The method of claim 1, further comprising:
   receiving the unprocessed transaction data in a first data format, and
   converting the unprocessed transaction data into a second data format that is machine-readable.

6. The method of claim 5, wherein the first data format comprises at least one of an email format or an image format, and wherein the second data format further comprises at least one of a text format or an Extensible Markup Language (XML) format.

7. The method of claim 1, wherein the anonymized version of the transaction data further comprises information indicative of a data source of the unprocessed transaction data.

8. The method of claim 1, wherein the digital fingerprint corresponds to one or more features of the unprocessed transaction data.

9. A system to share and control data with enhanced data anonymization comprising:
   a memory; and
   a processing device operatively coupled to the memory, the processing device to:
      receive a user input initiating posting of transaction data processed by an enhanced data anonymization process as an anonymized version of unprocessed transaction data, wherein the unprocessed transaction data is in an electronic document, and wherein the unprocessed transaction data comprises at least one set of data corresponding to a transaction, the at least one set of data comprising:
         at least one first data item comprising information that is personally identifiable information of a user;
         at least one second data item comprising information that is not personally identifiable information of the user;
      in response to the user input, generate an anonymized version of the set of data corresponding to the transaction by applying the enhanced data anonymization process comprising:
         extracting the at least one second data item from the unprocessed transaction data;
         creating a digital fingerprint of the electronic document, the digital fingerprint excluding the at least one first data item; and
         generating a new document and writing the extracted at least one second data item and the digital fingerprint to the new document; and
      in response to the user input, post, to a server, the anonymized version to enable the user to share and control the posted anonymized version with enhanced anonymization.

10. The system of claim 9, wherein the unprocessed transaction data comprises a purchase receipt.

11. The system of claim 9, wherein the anonymized version of the set of data further comprises a timestamp associated with the unprocessed transaction data.

12. The system of claim 9, wherein the anonymized version of the set of data further comprises a user identifier associated with an account of the user.

13. The system of claim 9, wherein the processing device is further to:
  receive the unprocessed transaction data in a first data format, and
  convert the unprocessed transaction data into a second data format that is machine-readable.

14. The system of claim 13, wherein the first data format comprises at least one of an email format or an image format, and wherein the second data format further comprises at least one of a text format or an Extensible Markup Language (XML) format.

15. The system of claim 9, wherein the anonymized version of the transaction data further comprises information indicative of a data source of the unprocessed transaction data.

16. The system of claim 9, wherein the digital fingerprint corresponds to one or more features of the unprocessed transaction data.

17. A non-transitory machine-readable storage medium to share and control data with enhanced data anonymization, the non-transitory machine-readable storage medium including instructions that, when accessed by a processing device, cause the processing device to:
  receive, by the processing device of a client device, a user input initiating posting of transaction data processed by an enhanced data anonymization process as an anonymized version of unprocessed transaction data, wherein the unprocessed transaction data is in an electronic document, and wherein the unprocessed transaction data comprises at least one set of data corresponding to a transaction, the at least one set of data comprising:
    at least one first data item comprising information that is personally identifiable information of a user;
    at least one second data item comprising information that is not personally identifiable information of the user;
  in response to the user input, generate, by the processing device of the client device, an anonymized version of the set of data corresponding to the transaction by applying the enhanced data anonymization process comprising:
    extracting the at least one second data item from the unprocessed transaction data;
    creating a digital fingerprint of the electronic document, the digital fingerprint excluding the at least one first data item; and
    generating a new document and writing the extracted at least one second data item and the digital fingerprint to the new document; and
  in response to the user input, post, by the processing device of the client device to a server, the anonymized version to enable the user to share and control the posted anonymized version with enhanced anonymization.

18. The non-transitory machine-readable storage medium of claim 17, wherein the unprocessed transaction data comprises a purchase receipt.

19. The non-transitory machine-readable storage medium of claim 17, wherein the anonymized version of the set of data further comprises a timestamp associated the unprocessed transaction data.

20. The non-transitory machine-readable storage medium of claim 17, wherein the anonymized version of the set of data further comprises a user identifier associated with an account of the user.

\* \* \* \* \*